(12) United States Patent
Watanabe et al.

(10) Patent No.: US 8,407,519 B2
(45) Date of Patent: Mar. 26, 2013

(54) REMEDYING METHOD FOR TROUBLES IN VIRTUAL SERVER SYSTEM AND SYSTEM THEREOF

(75) Inventors: Kentaro Watanabe, Yokohama (JP); Yoshimasa Masuoka, Kunitachi (JP)

(73) Assignee: Hitachi, Ltd., Tokyo (JP)

( * ) Notice: Subject to any disclaimer, the term of this patent is extended or adjusted under 35 U.S.C. 154(b) by 46 days.

(21) Appl. No.: 13/077,400

(22) Filed: Mar. 31, 2011

(65) Prior Publication Data

US 2011/0185228 A1      Jul. 28, 2011

Related U.S. Application Data

(63) Continuation of application No. 12/185,830, filed on Aug. 5, 2008, now Pat. No. 7,945,814.

(30) Foreign Application Priority Data

May 27, 2008   (JP) ................................ 2008-137528

(51) Int. Cl.
*G06F 11/00* (2006.01)
(52) U.S. Cl. ........................................... 714/19; 714/15
(58) Field of Classification Search .................... 714/15, 714/19
See application file for complete search history.

(56) References Cited

U.S. PATENT DOCUMENTS

| | | |
|---|---|---|
| 6,985,937 B1 | 1/2006 | Keshav et al. |
| 7,080,279 B2 | 7/2006 | Asare et al. |
| 7,694,123 B2 | 4/2010 | Prasse et al. |
| 2006/0225065 A1 | 10/2006 | Chandhok et al. |
| 2007/0174690 A1 | 7/2007 | Kambara et al. |
| 2009/0222690 A1 | 9/2009 | Seelig et al. |

*Primary Examiner* — Philip Guyton
(74) *Attorney, Agent, or Firm* — Mattingly & Malur, PC

(57) ABSTRACT

According to the invention, a managing server, using a snapshot-appended information table which stores management information for identifying snapshots of a virtual server, a setting change table which stores setting change information on the virtual server, and a policy table which stores policies to be met by the virtual server, acquires the setting change information from the setting change table, selects the setting change information items from the acquired setting change information matching policies stored in the policy table, acquires management information on the snapshots of the virtual server from the snapshot-appended information table, identifies a snapshot of the virtual server with reference to the acquired management information, changes the identified snapshot of the virtual server based on the selected setting change information items, and rolls back the virtual server according to the changed snapshot.

7 Claims, 13 Drawing Sheets

FIG.2

| TIME COLUMN | VIRTUAL SERVER | SNAPSHOT COLUMN |
|---|---|---|
| 2007/12/13 10:00:00 | VIRTUAL SERVER #1 | SNAPSHOT COLUMN #1 |
| 2007/12/13 10:00:00 | VIRTUAL SERVER #2 | SNAPSHOT COLUMN #2 |
| 2007/12/13 10:00:00 | VIRTUAL SERVER #3 | SNAPSHOT COLUMN #3 |
| 2008/01/13 12:00:00 | VIRTUAL SERVER #1 | SNAPSHOT COLUMN #4 |
| 2008/01/13 12:00:00 | VIRTUAL SERVER #2 | SNAPSHOT COLUMN #5 |

FIG.3

| 300 301 | 302 | 303 | 304 | 305 |
|---|---|---|---|---|
| SETTING CHANGE IDENTIFIER | TIME | OBJECT OF CHANGE | TIME COLUMN | SETTING CHANGE |
| CHANGE #1 | 2007/12/13 09:00:00 | VIRTUAL SERVER #1 | SETTING CHANGED | CHANGE SETTING ITEM Y1 IN SETTING FILE X1 TO Z1 |
| CHANGE #2 | 2008/01/13 10:00:00 | VIRTUAL SERVER #1 | SETTING CHANGED | CHANGE SETTING ITEM Y2 IN SETTING FILE X2 TO Z2 |
| CHANGE #3 | 2008/01/25 14:00:00 | VIRTUAL SERVER #1 | SETTING CHANGED | CHANGE SETTING ITEM Y3 IN SETTING FILE X3 TO Z3 |
| CHANGE #4 | 2008/01/25 14:00:00 | VIRTUAL SERVER #2 | SETTING CHANGED | CHANGE SETTING ITEM Y4 IN SETTING FILE X4 TO Z4 |
| CHANGE #5 | 2008/01/25 14:00:00 | VIRTUAL SERVER #3 | SETTING CHANGED | CHANGE SETTING ITEM Y5 IN SETTING FILE X5 TO Z5 |
| CHANGE #6 | 2008/01/25 14:00:00 | VIRTUAL SERVER #1 | APPLICATION INSTALLED | INSTALL APPLICATION #1 IN VIRTUAL SERVER #1 |
| CHANGE #7 | 2008/02/13 13:00:00 | VIRTUAL SERVER #1 | SECURITY PATCH APPLIED | APPLY SECURITY PATCH W1 |
| CHANGE #8 | 2008/02/13 14:00:00 | APPLICATION #1 | SECURITY PATCH APPLIED | APPLY SECURITY PATCH W2 |
| CHANGE #9 | 2008/02/13 15:00:00 | VIRTUAL SERVER #1 | SECURITY PATCH APPLIED | APPLY SECURITY PATCH W3 |
| CHANGE #10 | 2008/01/13 10:00:00 | VIRTUAL SERVER #1 | SETTING CHANGED | CHANGE SETTING ITEM Y10 IN SETTING FILE X10 TO Z10 |
| CHANGE #11 | 2008/02/14 12:00:00 | VIRTUAL SERVER #1 | SETTING CHANGED | CHANGE SETTING ITEM Y11 IN SETTING FILE X11 TO Z11 |
| CHANGE #12 | 2008/02/14 13:00:00 | VIRTUAL SERVER #1 | SETTING CHANGED | CHANGE SETTING ITEM Y12 IN SETTING FILE X12 TO Z12 |
| CHANGE #13 | 2008/02/14 14:00:00 | VIRTUAL SERVER #1 | SETTING CHANGED | CHANGE SETTING ITEM Y13 IN SETTING FILE X13 TO Z13 |

FIG.4

| POLICY IDENTIFIER | POLICY DEFINTION |
|---|---|
| POLICY #1 | VIRTUAL SERVER SHAL ALWAYS BE IN A STATE OF HAVING THE LATEST SECURITY PATCH |
| POLICY #2 | RESTORATION FROM TROUBLE SHALL TAKE NO MORE THAN 10 MINUTES |
| POLICY #3 | RESPONSE TIME LENGTHS OF 99% OF REQUESTS SHALL BE NO MORE THAN 10 SECONDS |

| IDENTIFIER | SETTING CHANGE | RESTRICTIVE INFORMATION |
|---|---|---|
| CONDITION #1 | CHANGE #2 | COMPLETION OF CHANGE #1 PRESUPPOSED |
| CONDITION #2 | CHANGE #3 | COMPLETION OF CHANGE #2 PRESUPPOSED |
| CONDITION #3 | CHANGE #8 | COMPLETION OF CHANGE #6 PRESUPPOSED |
| CONDITION #4 | CHANGE #9 | COMPLETION OF CHANGE #7 PRESUPPOSED |
| CONDITION #5 | CHANGE #7 | REQUIRED FOR VIRTUAL SERVER #1 |
| CONDITION #6 | CHANGE #13 | CHANGE #12 AND CHANGE #13 CONSTITUTE AN INSEPARABLE SEQUENCE OF CHANGES |

| IDENTIFIER | SETTING INFORMATION | RESTRICTIVE INFORMATION |
|---|---|---|
| CONDITION #1 | SETTING INFORMATION X1 OF VIRTUAL SERVER #1 | SETTING INFORMATION X2 AND VALUE OF VIRTUAL SERVER #2 SHOULD BE IDENTICAL |
| CONDITION #2 | SETTING INFORMATION X2 OF VIRTUAL SERVER #2 | SETTING INFORMATION X1 AND VALUE OF VIRTUAL SERVER #1 SHOULD BE IDENTICAL |

| BUSINESS SYSTEM | VIRTUAL SERVER |
|---|---|
| BUSINESS SYSTEM #1 | VIRTUAL SERVER #1 |
| BUSINESS SYSTEM #1 | VIRTUAL SERVER #2 |

| SERVER | APPLICATION |
|---|---|
| VIRTUAL SERVER #1 | APPLICATION #1 |
| VIRTUAL SERVER #1 | APPLICATION #2 |

800  801  802

REMEDYING METHOD FOR TROUBLES IN VIRTUAL SERVER SYSTEM AND SYSTEM THEREOF

This is a continuation application of U.S. application Ser. No. 12/185,830, filed Aug. 5, 2008, now allowed, the contents of which are hereby incorporated by reference into this application.

The present application claims priority from Japanese patent application No. 2008-137528 filed on May 27, 2008.

BACKGROUND OF THE INVENTION

1. Field of the Invention

The present invention relates to a technique for remedying problems in virtual server systems.

2. Description of the Related Art

Usually, problems tend to occur in business from wrong settings, mismatching settings, failures in software components or similar causes. To address such problems, the previous state can be recovered instantaneously by rolling back the system by the use of snapshots storing the previous state. Especially by using snapshots of virtual servers, the previous state can be restored for each individual virtual server to enable any problem having arisen in any virtual server to be remedied instantaneously.

Related methods by which system problems are remedied by rolling back using snapshots are already known, as disclosed in U.S. Pat. No. 7,080,279 (B2) [AUTOMIC ROLLBACK] and other pieces of literature. U.S. Pat. No. 7,080,279 (B2) discloses a method by which, when any system problem is detected, the problem is remedied by automatically rolling back the system by the use of a snapshot.

When a problem occurs, usually the system administrator analyzes the problem to identify its cause, and decides on a measure to eliminate the cause. This is to enable the most effective remedy to be selected against the problem and to prevent a similar problem from arising again. However, some business systems may require minimization of downtime. If the system administrator cannot identify the cause of the problem in a short enough period of time, often it is more effective to skip any analysis for finding out the cause of the problem and instead recover the previous trouble-free state by using snapshots.

While analysis of a problem occurring in a business system to identify its cause requires specialized knowledge on applications and databases constituting the business system, a problem remedying method using snapshots of virtual servers enables the system administrator, even if he or she has no specialized knowledge on components constituting the business system, such as applications and databases, to remedy the problem having occurred in the business system.

SUMMARY OF THE INVENTION

By the method of U.S. Pat. No. 7,080,279 (B2), when the business system is restored to its previous state by restoring snapshots or otherwise, mismatching may arise, such as the failure of the previous state to be consistent with the current policy.

Especially in a business system required to be consistent with an internal control policy, if the internal control policy is changed, rolling back using snapshots before the policy change may invite the future of the system to meet the requirements of the internal control policy.

Further, in a business system which requires a security policy of applying the latest security patch all the time, restoration of the previous state would mean a return to a state in which the security patches applied since the snapshots were stored to date are absent, inviting an additional problem of a drop in security level. Such a business system poses a problem that security patch application is required immediately after restoration and accordingly the business system can not immediately be resumed.

Further, in the case where a given business system comprises plural virtual servers, rolling back one of the virtual servers by using snapshots may invite mismatching of setting information and give rise to a new, secondary problem.

An object of the present invention, therefore, is to provide a method of rolling back a business system in a form consistent with the prevailing policy and a virtual server system for executing the method.

The invention addresses the problems in the following manner. According to one aspect of the invention, a managing server, using a snapshot-appended information table which stores management information for identifying snapshots of a virtual server, a setting change table which stores setting change information on the virtual server, and a policy table which stores policies to be met by the virtual server, acquires the setting change information from the setting change table, selects the setting change information items from the acquired setting change information matching policies stored in the policy table, acquires management information on the snapshots of the virtual server from the snapshot-appended information table, identifies a snapshot of the virtual server with reference to the acquired management information, changes the identified snapshot of the virtual server based on the selected setting change information items, and rolls back the virtual server according to the changed snapshot.

According to another aspect of the invention, a managing server, in response to a rollback request, executes the identification and the change of the snapshot.

According to still another aspect of the invention, a managing server, generates another virtual server, puts the identified snapshots of the virtual server onto the other virtual server with reference to the snapshot-appended information table, changes the snapshot on the other virtual server instead of the identified snapshot of the virtual server based on the selected setting change information items, stores the changed snapshot of the other virtual server, and, in response to a rollback request, reads the stored snapshot of the other virtual server into the virtual server.

According to still another aspect of the invention, a managing server, having a business configuration table which identifies the virtual server and another virtual server being related to business, identifies the other virtual server with reference to the business configuration table, acquires the setting change information of the other virtual server from the setting change table, selects another setting change information items from the acquired setting change information of the other virtual server, the acquired setting change information matching policies stored in the policy table, acquires another management information on the snapshots of the other virtual server from the snapshot-appended information table, identifies another snapshot of the other virtual server with reference to the acquired other management information, changes the identified other snapshot of the other virtual server based on the selected other setting change information items, and in response to a rollback request, rolls back other virtual server according to the changed other snapshot.

According to the invention, rolling back in consistency with the policy can be achieved by restoration using snapshots of virtual servers and rolling forward which selectively applies setting changes in consistency with the policy.

BRIEF DESCRIPTION OF THE DRAWINGS

FIG. 2 shows a snapshot-appended information table;

FIG. 3 shows a setting change table;

FIG. 4 shows a policy table;

FIG. 5 shows a setting change restriction table;

FIG. 6 shows a setting restriction table;

FIG. 7 shows a business configuration table;

FIG. 8 shows an application configuration table;

DETAILED DESCRIPTION OF THE PREFERRED EMBODIMENTS

Preferred embodiments of the present invention will be described in detail below with reference to the accompanying drawings.

Embodiment 1

Figure 1:
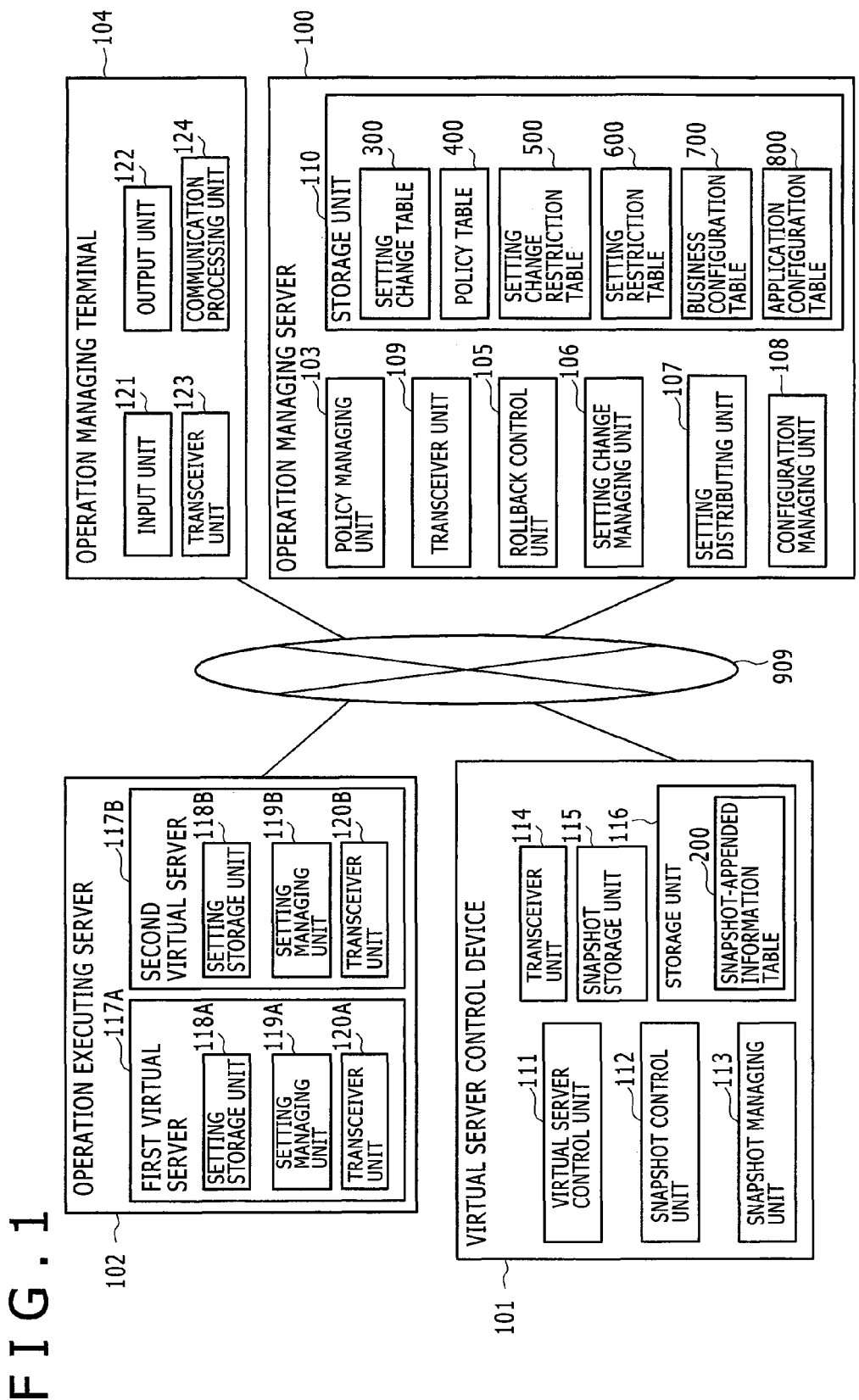
FIG. 1 is a block diagram showing the configuration of an information processing system.

FIG. 1 is a block diagram showing the configuration of an information processing system of Embodiment 1. The information processing system of this embodiment has an operation managing server 100, a virtual server control device 101, an operation executing server 102 and an operation managing terminal 104, which are connected to one another by a network 909.

The operation managing server 100 is a computer which manages the operations of the operation executing server 102, including rollback processing to be described afterwards. The operation managing server 100 has a policy managing unit 103, a rollback control unit 105, a setting change managing unit 106, a setting distributing unit 107, a configuration managing unit 108, a transceiver unit 109 and a storage unit 110.

The policy managing unit 103 is a processing unit which manages policies whose requirements should be satisfied by the objects of management by the operation managing server 100. The objects of management are objects whose operations are managed by the operation managing server 100. In this embodiment, the objects include the operation executing server 102, a first virtual server 117A and a second virtual server 117B. The policies are conditions to be satisfied by objects of management and combinations of such conditions and ways of processing to be executed when the conditions are met. For instance, as shown in a policy table 400 to be described afterwards, a policy that requires a state of being covered by the latest security patch all the time. The policy managing unit 103 manages the policy table 400, to be described afterwards, stored in the storage unit 110. When a message requesting a policy is received, the policy table 400 is read in, and the information specified by the request message is provided in response. Or when a message storing a policy is received, the policy table 400 is read in, and the policy specified by the message is stored into the policy table 400.

The rollback control unit 105 rolls back via the virtual server control device 101 the first virtual server 117A and the second virtual server 117B operating on the operation executing server 102.

The setting change managing unit 106 manages information on changing the computer setting information on the objects of operation management, such as the operation executing server 102, the first virtual server 117A and the second virtual server 117B. The setting change managing unit 106 detects any change in the computer setting information on the objects of operation management, such as the operation executing server 102, the first virtual server 117A and the second virtual server 117B, and stores into a setting change table 300 the detected setting change information. When it receives a message of request for reading out setting change information, the setting change managing unit 106 responds by reading the setting change information out of the setting change table 300.

The setting distributing unit 107 distributes the computer setting information on the objects of operation management such as the operation executing server 102, the first virtual server 117A and the second virtual server 117B. For instance, when the setting distributing unit 107 transmits a certain item of setting information to a setting managing unit 119A via the transceiver unit 109 and a transceiver unit 120A, the setting managing unit 119A rewrites the content of a setting storage unit 118A to the received setting information.

The configuration managing unit 108 manages the business configuration information and application configuration information of the computer setting information on the objects of operation management, such as the operation executing server 102, the first virtual server and the second virtual server. The business configuration information is information on relationships of correspondence between a business system and the constituents, such as a computer, of this business system. The application configuration information is information on relationships of correspondence between constituents, such as a computer, and applications included in these constituents.

The transceiver unit 109 executes communication processing for the operation managing server 100. The transceiver unit 109 allocates information received from the virtual server control device 101, the operation executing server 102 or the operation managing terminal 104 via the network 909 to the respective processing units of the operation managing servers specified by the received information. The transceiver unit 109 also transmits via the network information transmitted by the respective processing units of the operation managing server 100 to the virtual server control device 101, the operation executing server 102 or the operation managing terminal 104.

The storage unit 110 is a storage unit for storing information required for achievement of operation management processing by the operation managing server 100. The storage unit 110 is provided with the setting change table 300, the policy table 400, a setting change restriction table 500, a setting restriction table 600, a business configuration table 700 and an application configuration table 800.

The setting change table 300 is a table for storing information specifying any setting change in the objects of management managed by the operation managing server 100, such as the first virtual server and the second virtual server. The information specifying any setting change here is information specifying processing to change the setting information or the configuration information of objects of management. It includes, for instance, information specifying a change in the setting information value, application of a module such as a security patch, addition or deletion of an application, and a change in system configuration.

FIG. 3 shows the setting change table 300. The setting change table 300 stores information specifying a setting change on each of its lines. The setting change table 300 is provided with a setting change identifier column 301, a time column 302, an object of change column 303, a type column 304 and a setting change column 305. The setting change identifier column 301 stores identifying information for identifying any setting change. The time column 302 stores information for specifying the point of time at which the setting change has taken place. The object of change column 303 stores information for specifying the object of the setting change. The type column 304 stores information for specifying the type of the setting change. The setting change column 305 stores information for specifying the processing of the setting change.

The system administrator inputs information shown in the setting change table 300 via the operation managing terminal 104, and the setting change managing unit 106 stores the inputted information into the setting change table 300 of the storage unit 110. The setting change managing unit 106, detecting changes in setting information stored in the setting managing unit 119A or a setting managing unit 119B, stores the detected setting change information into the setting change table 300.

The policy table 400 is a table storing policies whose requirements have to be met by objects of management under the management of the operation managing server 100, such as the first virtual server and the second virtual server. The policies in this context include, for instance, the security policy and the policy indicating the level of service. FIG. 4 shows the policy table 400. A policy is stored on each line of the policy table 400. The policy table 400 has a policy identifier column 401 and a policy definition column 402. The policy identifier column 401 stores identifying information to identify a policy. The policy definition column 402 stores information to define the content of a policy.

The system administrator inputs information shown in the policy table 400 to a setting change restriction table 500 via the operation managing terminal 104, and the setting change managing unit 106 stores the inputted information into the policy table 400 of the storage unit 110.

The setting change restriction table 500 is a table storing restrictive conditions for setting changes stored in the setting change table 300. FIG. 5 shows the setting change restriction table 500. The table stores on each of its lines information specifying the restrictive condition of a setting change. The setting change restriction table 500 has an identifier column 501, a setting change column 502 and a restrictive information column 503. The identifier column 501 stores identifying information that identifies the restrictive conditions of setting changes. The setting change column 502 stores identifier information that identifies the setting changes to which the restrictive conditions apply, and this identifier information relates the setting changes to those identified by the setting change identifier column 301 of the setting change table 300. The restrictive information column 503 stores information that specifies the contents of the restrictive conditions of setting changes.

The system administrator inputs to the setting change restriction table 500 via the operation managing terminal 104 information shown in the setting restriction table 600, and the setting change managing unit 106 stores the inputted information into the setting change restriction table 500 of the storage unit 110. Also, setting information stored in the setting managing unit 119A and the setting managing unit 119B, setting change information stored in the setting change table 300 or the restrictive conditions of setting change information obtained from setting change restrictive information stored in the setting change restriction table 500 are stored into the setting change restriction table 500. Further, when any restrictive conditions between items of setting information are changed, the setting change managing unit 106 detects these changes and updates the setting change restriction table 500 according to the detected restrictive conditions between the items of setting information.

The setting restriction table 600 is a table which stores information specifying the restrictive conditions of setting information values. FIG. 6 shows the setting restriction table 600. The setting restriction table 600 stores on each of its lines the restrictive condition of a setting information value. The restriction table 600 has an identifier column 601, a setting information column 602 and a restrictive information column 603. The identifier column 601 stores identifying information that identifies the setting information values of restrictive conditions. The setting information column 602 stores information that identifies the objects of restrictive conditions of setting information values. The restrictive information column 603 stores information that identifies the restrictive conditions of setting information values.

The system administrator inputs information shown in the setting restriction table 600 into the setting change restriction table 500 from the setting restriction table 600 via the operation managing terminal 104, and the setting change managing unit 106 stores the inputted information into the setting restriction table 600 of the storage unit 110. Also, the restrictive conditions of setting restrictive information obtained in the setting managing unit 119A and the setting managing unit 119B are stored into the setting restriction table 600. Further, when any restrictive conditions between items of setting information are changed, the information stored in the setting restriction table 600 is updated.

The business configuration table 700 stores relationships of correspondence between constituents making up the business system including virtual servers. FIG. 7 shows the business configuration table 700. The business configuration table 700 stores on each of its lines the relationship of correspondence between the business system and a virtual server which is a constituent of the business system. The business configuration table 700 has a business system column 701 and a virtual server column 702. The business system column 701 stores identifying information that identifies the business system. The business system is a system that executes business processing necessary for operating a company, such as sales, production, accounting or logistics, and typically may be a financial management system, salary management system, on-line purchase system or sales management system. A business system may be operating on and made up or plural virtual servers may work together to constitute a business server. The virtual server column 702 stores identifying information that identifies the virtual server.

The system administrator inputs information shown in the business configuration table 700 into the business configuration table 700 via the operation managing terminal 104, and the configuration managing unit 108 stores the received information into the business configuration table 700 of the storage unit 110. Or, the relationship of correspondence between the business system and a virtual server obtained from setting information stored in the setting managing unit 119A and the setting managing unit 119B may as well be stored in the business configuration table 700. Further, in response to any change in business configuration, the business configuration table 700 is updated.

The application configuration table 800 is a table which stores configurative information on applications operating on virtual servers. FIG. 8 shows the application configuration table 800. The application configuration table 800 stores on each of its lines the relationship of correspondence between a virtual server and an application. The application configuration table 800 has a server column 801 and an application column 802. The server column 801 stores identifying information that identifies virtual servers. The application column 802 stores identifying information that identifies applications.

The application configuration table 800 shows that the application specified by the application column 802 is operating in the virtual server specified by the server column 801. The system administrator inputs information shown in the application configuration table 800 into the application configuration table 800 via the operation managing terminal 104, and the configuration managing unit 108 stores the inputted information into the application configuration table 800 of the storage unit 110. Or, the relationship of correspondence between the business system and a virtual server obtained from setting information stored in the setting managing unit 119A and the setting managing unit 119B may as well be stored in the application configuration table 800. Further, in response to any change in application configuration, the application configuration table 800 is updated.

Figure 9:
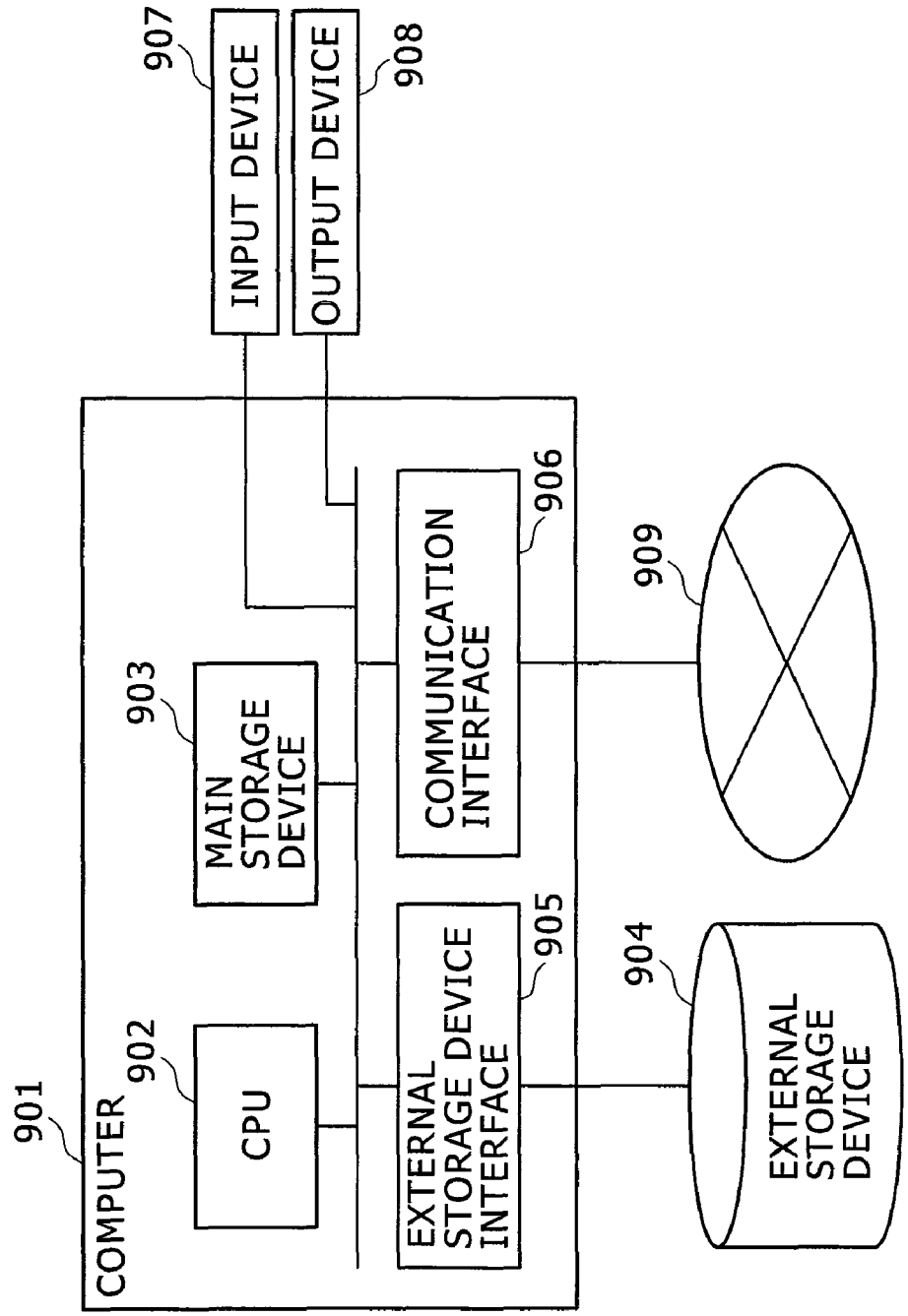
FIG. 9 shows the hardware configuration of a computer.

The operation managing server 100 is realized by a computer 901 of the hardware configuration shown in FIG. 9. The rollback control unit 105, the setting change managing unit 106, the setting distributing unit 107 and the configuration managing unit 108, which are programs stored in an external storage device 904, are read in onto a main storage device 903 via an external storage device interface 905, and executed by a CPU 902. The transceiver unit 109 is realized by a communication interface 906 and a communication control program controlling it. The storage unit 110 is realized by the main storage device 903 and/or the external storage device 904.

The hardware configuration of the virtual server control device 101, the operation executing server 102 and the operation managing terminal 104 is also similar to that of the computer 901 shown in FIG. 9 though there may some differences in scale and performance.

Although the operation managing server 100, the virtual server control device 101, the operation executing server 102 and the operation managing terminal 104 are shown in FIG. 1 as all different computers, they may as well be configured as plural computers or some of them may be combined into a single computer.

Referring back to FIG. 1, the virtual server control device 101 will be described in more detail. The virtual server control device 101 is a device for controlling virtual servers, and controls virtual servers such as the first virtual server 117A and the second virtual server 117B to be described afterwards. The virtual server control device 101 is provided with a snapshot control unit 112, a snapshot managing unit 113, a transceiver unit 114 and a snapshot storage unit 110.

The snapshot control unit 112 restores into a virtual server processing by the virtual server to take a snapshot or a stored snapshot to execute processing to return to a state in which a snapshot has been taken. For instance, the snapshot control unit 112 executes processing to store snapshots by the first virtual server 117A or the second virtual server 117B into the snapshot storage unit 115 to be described afterwards via the snapshot managing unit 113 also to be described afterwards, or processing to restore the first virtual server 117A and the second virtual server 117B by reading snapshots out of the snapshot storage unit 115 to be described afterwards via the snapshot managing unit 113 also to be described afterwards.

The snapshot managing unit 113 executes processing to store snapshots into the storage unit 110 to be described afterwards or processing to restore snapshots.

The transceiver unit 114 executes communication processing of the virtual server control device 101, and transmits or receives information to and from the operation managing server 100, the operation executing server 102 or the operation managing terminal 104 via the network 909.

The snapshot storage unit 115 stores snapshots by virtual servers such as the first virtual server 117A and the second virtual server 117B. It may store plural generations of snapshots of a certain virtual server.

A storage unit 116 stores information appended to snapshots by virtual servers. The appended information includes information to specify the virtual server which is the source of a given snapshot, information to specify the time at which a given snapshot was stored and information to specify snapshot stored in the snapshot storage unit 115.

The storage unit 116 stores in a snapshot-appended information table 200 appended information for managing snapshots of virtual servers. FIG. 2 shows the snapshot-appended information table 200. The snapshot-appended information table 200 stores on each of its lines appended information on one snapshot. The snapshot-appended information table 200 has a time column 201, a virtual server column 202 and a snapshot column 203. The time column 201 stores the points of time of recording snapshots. The virtual server column 202 stores identifying information that identifies the object virtual server of each snapshot taken. The snapshot column 203 stores identifying information that identifies snapshots stored in the snapshot storage unit 115. For instance, the first line of the snapshot-appended information table 200 shown in FIG. 2 indicates that the snapshot identified by "Snapshot #1" of the virtual server identified by "Virtual server #1" at "Dec. 13, 2007 10:00'00" is stored in the snapshot storage unit 115.

The virtual server control device 101 can be realized by the computer 901 shown in FIG. 9. A virtual server control unit 111, the snapshot control unit 112 and the snapshot managing unit 113 can be reading in programs stored in the external storage device 904 onto the main storage device 903 and having them executed by the CPU 902. The transceiver unit 114 can be realized by the communication interface 906. Further, the snapshot storage unit 115 and the storage unit 116 can be realized by the external storage device 904.

The operation executing server 102 is a computer under which the business system managed by the operation managing server 100 is operating. The operation executing server 102 and the business system need not be in a one-to-one correspondence. Thus, a single business system may operate on the operation executing server 102 or one business system may operate for each of the virtual servers operating on the operation executing server 102. Further, a business system may be configured of plural operation executing servers 102.

The operation executing server 102 is provided with the first virtual server 117A and the second virtual server 117B. The first virtual server 117A is a virtual server operating on the operation executing server 102, and is provided with the setting storage unit 118A, the setting managing unit 119A and the transceiver unit 120A. The setting storage unit 118A stores setting information for the first virtual server 117A. The setting managing unit 119A executes the processing of setting or changing of setting information for the first virtual server 117A stored in the setting storage unit 118A. The transceiver unit 120A executes processing of communication between the setting storage unit 118A or the setting managing unit 119A and the operation managing server 100, the virtual server control device 101 or the operation managing terminal 104. The second virtual server 117B is a virtual server operating on the operation executing server 102, and is provided with the processing units of a setting storage unit 118B, the setting managing unit 119B and a transceiver unit 120B. The operations of these processing units are similar to those of the first virtual server 117A.

Incidentally, virtual servers to operate on the operation executing server 102 are not limited to the first virtual server 117A and the second virtual server 117B. Thus, the first virtual server 117A and the second virtual server 117B may be the same virtual server or a third virtual server may also be operating in addition to the first virtual server 117A and the second virtual server 117B. The operation executing server 102 can be realized by the computer 901 shown in FIG. 9.

The setting managing unit 119A, the setting managing unit 119B, the transceiver unit 120A and the transceiver unit 120B can be realized by reading in programs stored in the external storage device 904 onto the main storage device 903 and having them executed by the CPU 902.

Incidentally, the transceiver unit 120A and the transceiver unit 120B can as well be realized by the communication interface 906. Or the storage unit 118A and the storage unit 118B can also be realized by the external storage device 904.

The operation managing terminal 104 is a computer which controls processing of inputs to the operation managing server 100 and processing outputs from the operation managing server 100. The system administrator transmits to the operation managing server 100 via the operation managing terminal 104 a message of request for rolling back the first virtual server 117A and the second virtual server 117B. Also, it transmits to the snapshot control unit 112 via the operation managing terminal 104 a message of request for storing snapshots by the first virtual server 117A and the second virtual server 117B. Further, it transmits to the operation managing server 100 via the operation managing terminal 104 a message of request for changing the setting information of the first virtual server 117A and the second virtual server 117B. It also transmits a message of request for setting changes directly to the first virtual server 117A and the second virtual server 117B via the operation managing terminal 104.

The operation managing terminal 104 has an input unit 121, an output unit 122, a transceiver unit 123 and a communication processing unit 124. The input unit 121 inputs information pertaining to the aforementioned various request messages inputted by the system administrator, and the output unit 122 outputs information to the system administrator.

The transceiver unit 123 is a processing unit which executes processing of transmission and reception including the transmission of information, received from the processing units of operation managing terminals, such as the communication processing unit 124, to the network, and transmission of information received from the network to the processing units. The communication processing unit 124 executes processing of communication with the operation managing server 100. The operation managing terminal 104 can be realized by the computer 901 shown in FIG. 9. The communication processing unit 124 can be realized by reading in programs stored in the external storage device 904 onto the main storage device 903 and having them executed by the CPU 902. The transceiver unit 123 can be realized by the communication interface 906. The input unit 121 can be realized by an input device 907. The input device 907 may be, for instance, a pointing device such as a mouse or a keyboard.

The output unit 122 can be realized by an output device 908. The output device 908 may be, for instance, a monitor.

Figure 10:
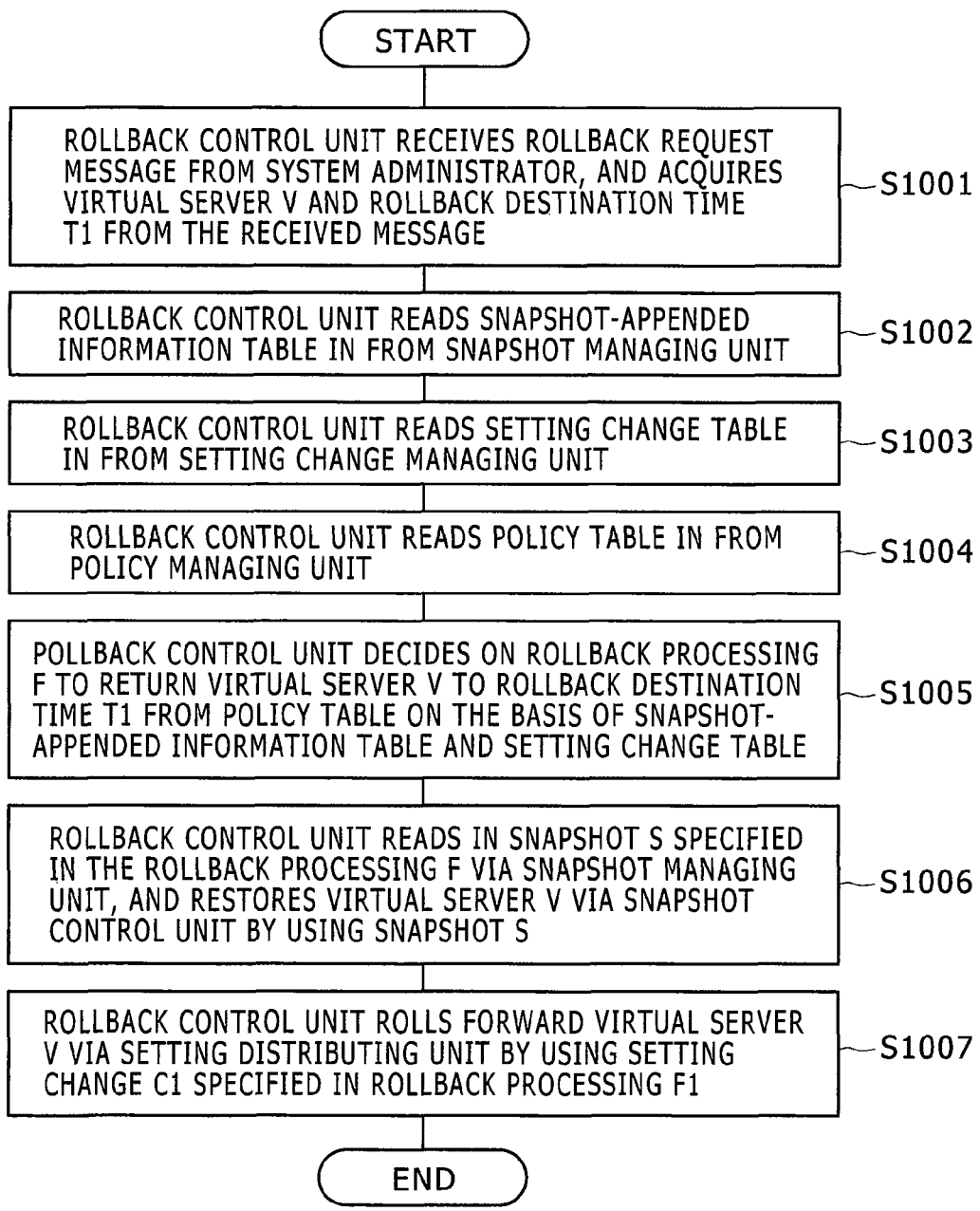
FIG. 10 is a flow chart showing the overall processing by an information processing system in Embodiment 1.

FIG. 10 is a flow chart showing the overall processing by the information processing system in this embodiment.

(1) The rollback control unit 105 receives a rollback request message from the system administrator, and acquires a virtual server V and a rollback destination time T1 from the received message (step 1001). Or the processing at step 1001 may be replaced by detection of the problem in the virtual server V by the rollback control unit 105 and specification of the point of time T1 before the problem occurrence.

(2) The rollback control unit 105 reads the snapshot-appended information table 200 in from the storage unit 116 via the snapshot managing unit 113 (step 1002).

(3) The rollback control unit 105 reads the setting change table 300 in from the setting change managing unit 106 (step 1003).

(4) The rollback control unit 105 reads the policy table 400 in from the policy managing unit 103 (step 1004).

(5) The rollback control unit 105 decides on rollback processing F to return the virtual server V to the rollback destination time T1 in a form which satisfies the requirements of the policy table 400 on the basis of the snapshot-appended information table 200 and the setting change table 300 (step 1000). Here, the rollback processing F is information that specifies rolling back of the virtual server V using a snapshot S, the application of a setting change to the virtual server V and the sequence thereof. Details of processing to specify the rollback processing F at step 1005 will be described afterwards with reference to FIG. 11.

(6) The rollback control unit 105 reads in the snapshot S specified in the rollback processing F via the snapshot managing unit 113, and restores the virtual server V via the snapshot control unit by using the snapshot S (step 1006).

More specifically, the processing is as follows. Here, the virtual server V is supposed to be the first virtual server 117A. The rollback control unit 105 specifies the first virtual server 117A and the snapshot S, and transmits a restoration request message through the transceiver unit 109 to the snapshot control unit 112 via the network 909. The snapshot control unit 112 having received the restoration request message acquires the snapshot S from the snapshot storage unit 115, and executes restoration of the first virtual server by using the snapshot S. The restoration is processed via the transceiver unit 114 through the network 909.

(7) The rollback control unit 105 rolls forward virtual server V via the setting distributing unit 107 by using a setting change C specified in the rollback processing F (step 1007).

More specifically, the processing is as follows. Here, the virtual server V is supposed to be the first virtual server. The rollback control unit 105 transmits a setting change request message specifying the first virtual server and the setting change C through the transceiver unit 109 to the first virtual server 117A via the network 909. The setting managing unit 119A of the first virtual server 117A having received the message via the transceiver unit 120A applies the setting change C to the setting storage unit 118A.

Figure 11:
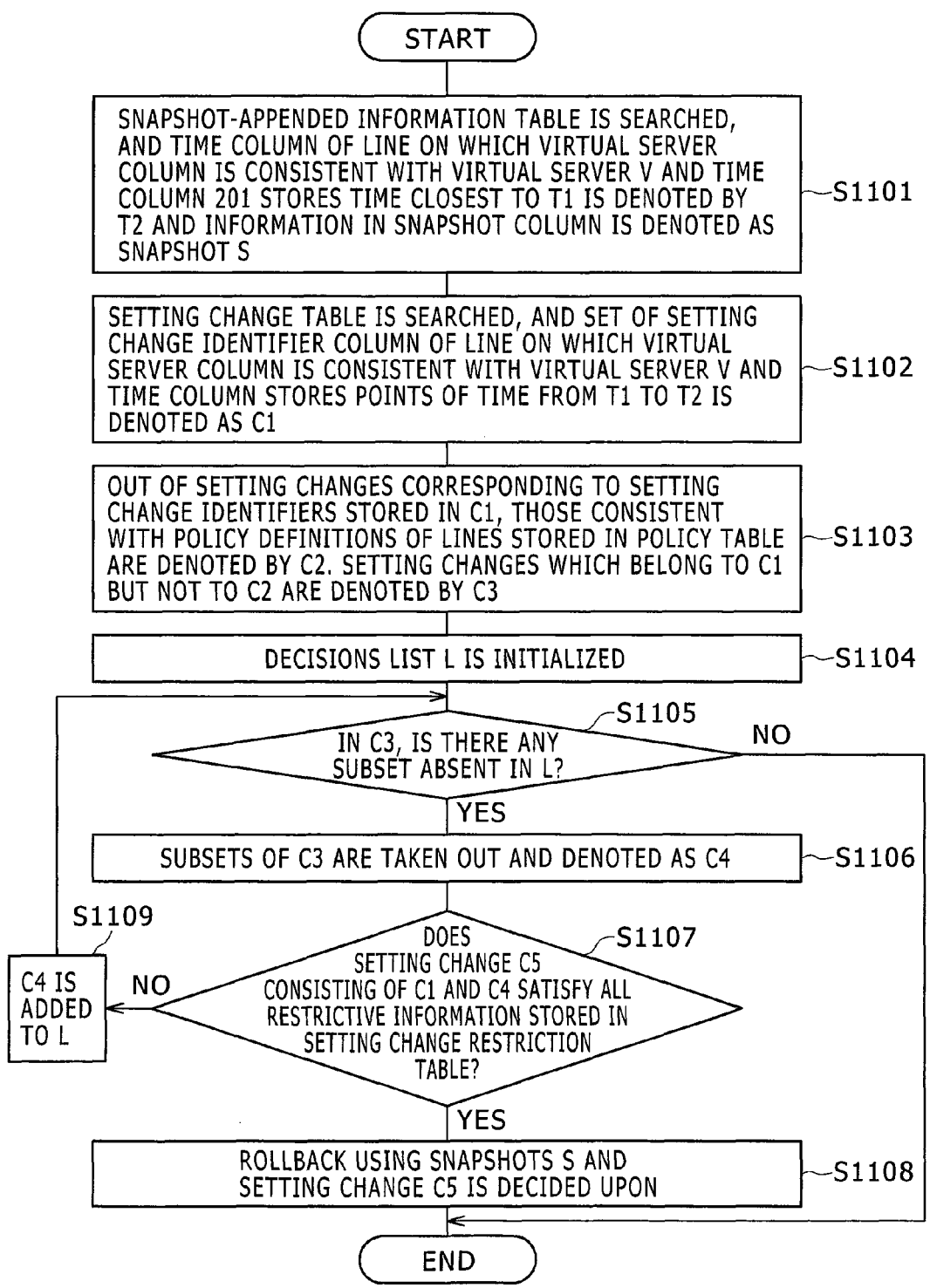
FIG. 11 is a flow chart showing restoration processing.

FIG. 11 is a flow chart showing restoration processing at step 1005 in detail.

(1) The snapshot-appended information table 200 is searched, and the time column 201 of the line on which the virtual server column 202 is consistent with the virtual server V and the time column 201 stores the point of time closest to T1 is denoted by T2 and information in the snapshot column 203 is denoted as the snapshot S (step 1101).

Step 1101 is processing to specify the snapshot to be used for rolling back. It is supposed, for instance, that the virtual server V is "Virtual server #1" and the point of time T1, 'Feb. 14, 2008 11:00'00'". The rollback control unit 105 searches the snapshot-appended information table 200, and references the snapshot column 203 on the line where the virtual server column 202 is "Virtual server #1" and "Jan. 13, 2008" is stored in the time column 201 as the latest day before the point of time T1. "Snapshot #4" stored in the snapshot column 203 is stored as the snapshot S. Also, 'Jan. 13, 2008 12:00'00'" stored in the time column 201 is designated as the point of time T2.

(2) The setting change table 300 is searched, and the set of information stored in the setting change identifier column 301 of the line on which the object of change column 303 is consistent with the virtual server V and the time column 302 stores the points of time from T1 to T2 is denoted as the setting change C1 (step 1102).

Step 1102 is processing to specify the setting change to be used for rolling back. It is supposed, for instance, that the virtual server V is "Virtual server #1", the point of time T1 is 'Feb. 14, 2008 11:00'00'" and the point of time T2 is 'Jan. 13, 2008 12:00'00'". The rollback control unit 105 searches the setting change table 300, and specifies the lines of time from the point of time T1 to the point of time T2 are in the time column 302 and "Virtual server #1" is stored in the object of change column 303. Then, "Change #3", "Change #6", "Change #7", "Change #9" and "Change #10" stored in the setting change identifier column 301 of the lines are stored as the setting change C1.

Or, the rollback control unit 105 may specify here the lines on which the objects of change belonging to the virtual server V are to be stored in the object of change column 303 and add them to the setting change C. The objects of change belonging to the virtual server V may be, for instance, applications operating on the virtual server V.

Specification of the objects of change belonging to the virtual server V is processed as described below in specific terms. The rollback control unit 105 reads in the application configuration table 800 from the storage unit 110 through the configuration managing unit 108, searches for lines having the virtual server V stored in the server column 801, and information specifying the application stored in the application column 802 of the lines is designated as the applications A. Then, the rollback control unit 105 searches the setting change table 300, and specifies the lines where the points of time from T1 to T2 are stored in the time column 302 and the applications A are stored in the object of change column 303. The information stored in the setting change identifier column 301 of the lines is specified, and the information is added to the setting change C1.

It is supposed, for instance, that the virtual server V is "Virtual server #1", the point of time T1 is 'Feb. 14, 2008 11:00'00'" and the point of time T2 is 'Jan. 13, 2008 12:00'00'". The rollback control unit 105 searches the application configuration table 800 for lines on which "Virtual server #1" is stored in the server column 801, and designates the information "Application #1" and "Application #2" which specify the applications stored in the application column 802 of the lines as the applications A. Then, the rollback control unit 105 searches the setting change table 300, and specifies the lines of which the time column 302 stores points of time from 'Feb. 14, 2008 11:00'00'" to 'Jan. 13, 2008 12:00'00'" and the object of change column 303 stores "Application #1" and "Application #2". The information stored in the setting change identifier column 301 of the lines is specified, and the information "Change #8" is added to the setting changes C1 "Change #3", "Change #6", "Change #7", "Change #9" and "Change #10".

(3) Out of the setting changes corresponding to the setting change identifiers stored in the setting change C1, those consistent with the policy definitions of the lines stored in the policy table 400 are denoted by C2. Setting changes which belong to the setting changes C1 but not to the setting change C2 are denoted by C3 (step 1103).

A setting change C2 matching policies stored in the policy table 400 is determined out of the setting changes C1. The setting change C2 may be determined by one of the following methods, for instance, but these are not the only applicable methods. To begin with, a first method will be described. At step 1103, the rollback control unit 105 specifies the setting change C2 that is consistent with all the policies stored in the policy table 400 and the smallest in the number of setting changes. Specifically, the processing is done in the following way. It is supposed, for instance, that the installed changes C1 are "Change #3", "Change #6", "Change #7", "Change #8", "Change #9" and "Change #10". Since "Policy #1" stored in the policy table 400 requires "always be in a state of having the latest security patch", the rollback control unit 105 searches the setting change table 300 for lines having setting changes identified by the setting change C1 in the setting change identifier column 301, extracts lines having "Security patch applied" in the type column 304 thereof, and designates "Change #7", "Change #8" and "Change #9" in the setting change identifier column 301 thereof as the setting changes C2.

Incidentally, though "Change #6" has no direct relevance to satisfy the policy requirement here, since it is a prerequisite to "Change #8", "Change #6", "Change #7", "Change #8" and "Change #9" may as well be designated as the setting changes C2.

Then, the foregoing processing is executed for all the policies stored in the policy table 400 to specify the setting changes C2.

Where "Change #6", "Change #7", "Change #8" and "Change #9" are to be designated as the setting changes C2 by this first method, the rollback control unit 105 may further specify a setting change C3 which belongs to the setting changed C1 but not to the setting changes C2 and, after applying the setting changes C2, apply the setting change C3.

Next, a second method will be described. Conversely to the first method, neither "Change #6" nor "Change #8" is included in the setting changes C2, but "Change #8" and "Change #9" are designated as the setting changes C2. The reason is that according to the setting change restriction table 500 "Change #6" is a setting change regarding an increase or a decrease in the objects of change, specifically the installation of an application, and therefore "Change #8" is a setting change regarding "Change #6".

More specifically, the processing is as follows. It is supposed, for instance, that the installed changes C1 are "Change #3", "Change #7", "Change #8", "Change #9" and "Change #10". The rollback control unit 105 checks whether or not the setting change which is the prerequisite to each of the setting changes C1 has been done. For instance, the rollback control unit 105 references the setting change restriction table 500, and specifies that "Change #6" presuppose "Change #8" according to "Condition #3". Then it determines whether or not "Change #6" belongs to the setting changes C1 and, if it determines not, specifies "Change #3", "Change #7", "Change #9" and "Change #10" as the setting changes C2, with "Change #8" being considered unnecessary and excluded from the setting changes C1.

Incidentally, step 1103 is not limited to the first method and the second method, but may use any other appropriate method. The choice of the method for step 1103 may as well be stored, for instance, in the policy table 400 to have the stored method read in by the rollback control unit 105 and executed at step 1103.

This embodiment described above is not limited to this mode of implementation. For instance, the rollback control unit 105 may receive a rollback request specifying the virtual server V and the point of time T1 of the rollback destination to start rollback processing, or the rollback control unit 105 may detect any problem in the virtual server V and determine the point of time T1 of the rollback destination to start rollback processing.

For instance, the point of time T1 of rollback destination is determined by the processing described below. The rollback control unit 105 specifies the line which has the virtual server V stored in the object of change column 303 of the setting change table 300 and in whose time column 302 a point of time immediately before or the same point of time T3 as the point of time T4 at which a problem occurred is stored. A point of time earlier than the point of time T3 is determined as the point of time T1 of rollback destination.

If the setting change identified on the specified line constitutes part of a sequence with and is inseparable from an earlier setting change, a time before that earlier setting change in the sequence is specified and determined as the point of time T1 of rollback destination. It is supposed, for instance, that only "Change #13" has been specified as the setting change for roll forward. Then "Change #12" and "Change #13" are inseparable according to "Condition #6" in the setting change restriction table 500, the rollback control unit determines as the point of time T1 of rollback destination a point of time before "Change #12" and "Change #13" were stored in the time column 302. This kind of processing can prevent rolling back from occurring on the way of a sequence of setting changes. Also, occurrence of a problem as a consequence of impossibility to make sequential setting changes after rolling back can be prevented. Furthermore, the workload of resetting a sequence of setting changes on the system administrator after rolling back can be reduced.

In this embodiment, as so far described, by using the snapshot-appended information table 200 which stores management information for managing snapshots of virtual servers, the setting change table 300 which stores setting change information for virtual servers, and the policy table 400 which stores policies whose requirements have to be met by the virtual servers of the objects of management, in response to a rollback request, management information on snapshots is acquired from the snapshot-appended information table 200, setting change information is acquired from the setting change table 300, setting change information matching a policy stored in the policy table 400 is selected from the items of setting change information, the snapshot to be used for rolling back is determined with management information on snapshots, and a virtual server is rolled back according to the determined snapshot and the selected setting change information. This embodiment enables the virtual server to be rolled back in conformity with the policy by restoration using the snapshot of the virtual server and rolling forward by selective application of a setting change conforming to the policy.

Embodiment 2

This embodiment represents a method by which business can be resumed in a state satisfying the requirements of a policy immediately after the completion of rolling back by using a snapshot to which a setting change defined by the policy in advance is used for restoring the virtual server.

In this embodiment, every time a setting change conforming to a policy occurs in the first virtual server, processing to have the second virtual server read in the snapshot of the first virtual server is executed by applying the change processing to store the snapshot, and this is realized by reading in the snapshot when the first virtual server is rolled back.

Figure 12:
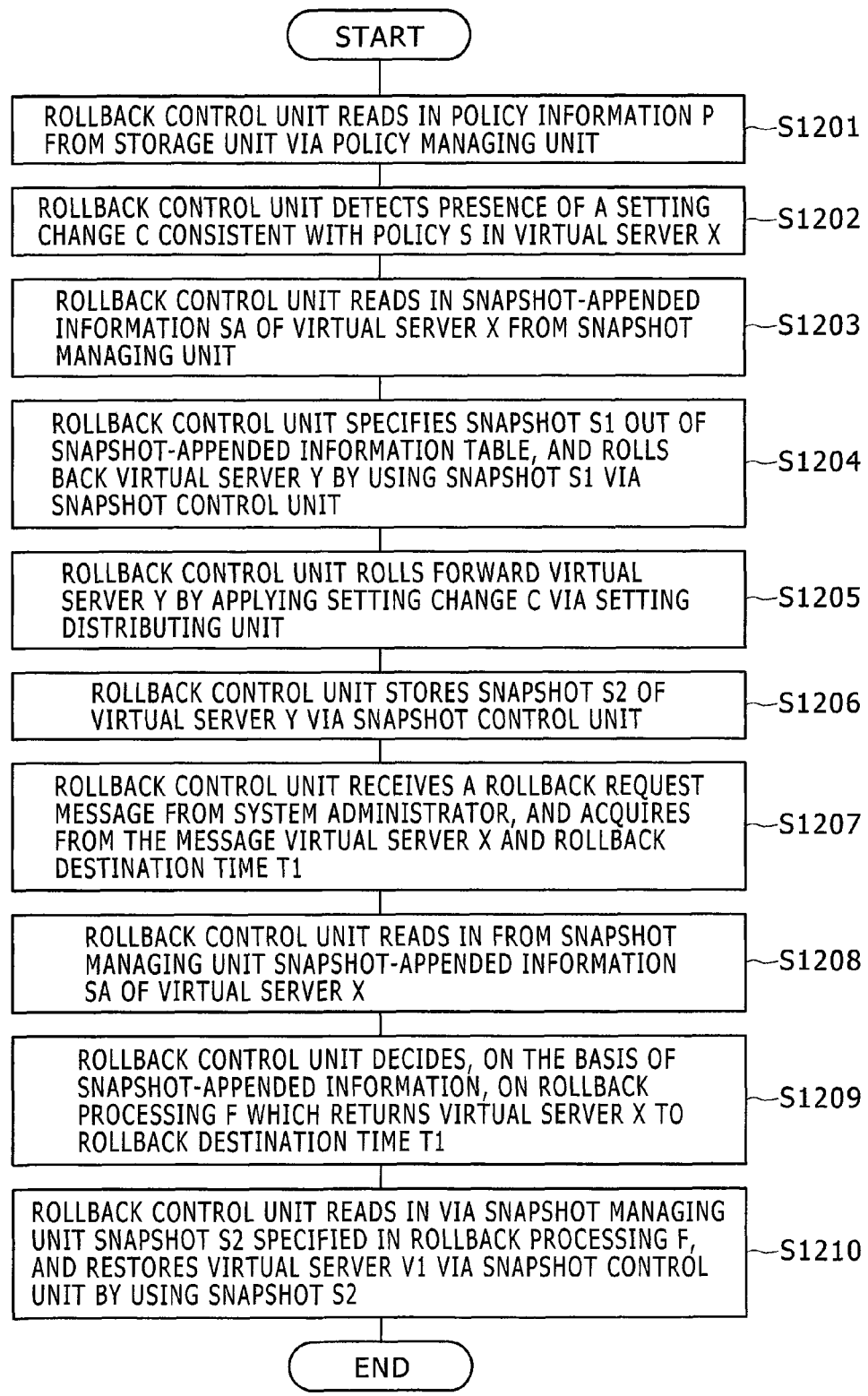
FIG. 12 is a flow chart showing the overall processing by an information processing system in Embodiment 2.

FIG. 12 is a flow chart showing the overall processing by an information processing system in this embodiment.

(1) The rollback control unit 105 reads in the policy table 400 from the storage unit 110 via the policy managing unit 103 (step 1201).

(2) The rollback control unit 105 detects the presence, in a virtual server X, of a setting change C consistent with a policy S stored in the policy table 400 (step 1202).

For instance, when a setting change of applying a security patch SP has taken place in the virtual server #1, the rollback control unit 105 detects this change as the occurrence in the virtual server #1 of a setting change matching a policy #1 stored in the policy table 400. More specifically, when a setting change has taken place, first the setting change is added to the setting change table 300 as a new line. Next, the type column 304 of the line is referenced to determine whether or not it is consistent with any policy stored in the policy definition column 402. If the determination reveals that it is, the setting change is stored as a setting change C which is a setting change consistent with a policy has taken place. If not, the setting change is not stored and the processing is ended.

At step 1202, the rollback control unit 105 stores the virtual server X and the setting change C.

(3) The rollback control unit 105 reads in the snapshot-appended information table 200 from the storage unit 116 via the snapshot managing unit 113 (step 1203).

(4) The rollback control unit 105 specifies a snapshot S1 out of the snapshot-appended information table 200, and rolls back a virtual server Y by using the snapshot S1 via the snapshot control unit 111 (step 1204).

Specifying the snapshot S1 at step 1204 means specifying a snapshot regarding the virtual server X stored in the snapshot-appended information table 200. More specifically, it is processed as described below. If there is in the virtual server #1 a setting change consistent with a policy, the snapshot-appended information table 200 is searched to specify the line on which the virtual server #1 is stored in the virtual server column 202, and information stored in the snapshot column 203 on the line is stored as the snapshot S1.

Incidentally, where plural snapshots are specified, the processing from step 1204 onward is applied to each snapshot. Where plural snapshots are specified, the processing from step 1204 onward may as well be applied only to the nearest snapshot. Also, depending on policies stored in the policy table 400, the processing of step 1204 may be applied only to snapshots matching the policies out of the plurality of snapshots.

The virtual server Y which performs rollback using the snapshot S1 at step 1204 is a different virtual server from the virtual server X at step 1202. The virtual server Y may be either newly actuated or specified out of already actuated virtual servers at step 1204.

Further, the operation executing server 102 on which the virtual server Y operates may be either the same as or different from the operation executing server 102 on which the virtual server X operates. Where if is different, if the operation executing server 102 on which the virtual server Y operates is physically close to the snapshot storage unit 115, there is a possibility to reduce the overhead of the network and to finish the rollback processing earlier. Or when the rollback control unit 105 is to specify the virtual server Y in this embodiment, it may as well specify as the virtual server Y a virtual server operating on the operation executing server 102 at a physically short distance from the snapshot storage unit 115. Or the virtual server Y may as well be operated on the same hardware as the snapshot storage unit 115 or the external storage device 904 storing the snapshot storage unit 115.

It is also possible to specify the virtual server Y which enables the rollback control unit 105 to execute rollback processing rapidly by referencing configurative information or operational information on the external storage device 904 which realizes a snapshot storage unit, the external storage device interface 905, the communication interface 906 or the network 909. The configurative information in this context means information regarding the communicating velocity or the communication system of the interface, and the operational information concerns the state of use of the interface and the like.

To describe more specifically the processing in the case of the virtual server #1 functioning as the virtual server X, it is supposed that the virtual server column 202 of the snapshot-appended information table 200 is searched to specify the line on which the virtual server #1 is stored, and a snapshot #1 and a snapshot #4 stored in the snapshot column 203 of the line are designated as the snapshots S1. A virtual server #4 and a virtual server #5 having the same structure as the virtual server #1 are newly actuated. Then, the virtual server #4 is rolled back by using the snapshot #1, and the virtual server #5 is rolled back by using the snapshot #4.

It is supposed here that the virtual server #1 is a virtual server corresponding to the first virtual server 117A of FIG. 1 and that the virtual server #4 and the virtual server #5 are positioned as virtual servers corresponding to the second virtual server 117B. The virtual server #4 and the virtual server #5 may either be different or the same virtual servers. However, if they are the same virtual servers, one of the snapshot #1 and the snapshot #4 has to complete the execution of processing of step 1204 through step 1206 after the other has completed the execution of processing of step 1204 through step 1206.

(5) The rollback control unit 105 rolls forward the virtual server Y by applying the setting change C via the setting distributing unit 107 (step 1205). Supposing that the virtual server X is the virtual server #1, the snapshots S1 are the snapshot #1 and the snapshot #4, the virtual servers Y are the virtual server #4 and the virtual server #5 respectively matched with the snapshot #1 and the snapshot #4, and the setting change C is the application of the security patch SP, the processing here will be described more specifically. The rollback control unit 105 applies the security patch SP to the virtual server #4 via the setting distributing unit 107. Similarly, it applies the security patch SP to the virtual server #5 via the setting distributing unit 107.

Incidentally, though not illustrated, a new row may be provided in the setting change table 300 to enable flag information, according to which whether or not any setting change has applied to a snapshot can be determined, to be stored. For instance, it is supposed that the row is a snapshot-applied flag column, and the flag information to be stored in the column is "F" if no setting change is applied to the snapshot or "F" it any setting change is applied. Then, at step 1205, the rollback control unit searches the setting change table 300 via the setting change managing unit 106, and changes the snapshot-applied flag column of the line on which the setting change C is stored from "F" to "T". By providing the snapshot-applied flag column, it is made possible, when individual setting changes not consistent with a policy are to be applied after rolling back the virtual server X at step 1210 to be described afterwards, to exclude already applied setting changes C from the application or to exclude from the application any setting change that cannot be set simultaneously with any already applied setting change C.

(6) The rollback control unit 105 stores the snapshot S 2 of the virtual server Y via the snapshot control unit 112 (step 1206).

At step 1206, the rollback control unit 105 stores the snapshot S2 into the snapshot storage unit 115 through the snapshot managing unit 113, and stores appended information on the snapshot S2 into the snapshot-appended information table 200 of the storage unit 116.

Storing appended information on the snapshot S2 may be accomplished either by overwriting appended information on the snapshot S1 stored in the snapshot-appended information table 200 or by adding a new line and storing appended information on the snapshot S2 thereon. By whichever method, information to specify the virtual server X is stored in the virtual server column 202 as appended information, and the method of specifying the snapshot S2 is stored in the snapshot column 203. This causes the snapshot S2 to be stored as a snapshot resulting from the application of the setting change C to the snapshot S1 of the virtual server X.

Supposing that the virtual server X is the virtual server #1, the snapshots S1 are the snapshot #1 and the snapshot #4, and the virtual servers Y are the virtual server #4 and the virtual server #5 respectively matched with the snapshot #1 and the snapshot #4, the processing at step 1206 will be described more specifically with reference to a case of overwriting. The rollback control unit 105 stores a snapshot of the virtual server #4 via the snapshot control unit 112, and stores it in the snapshot storage unit 115 as a snapshot #6. It also stores a snapshot of the virtual server #5, and stores it in the snapshot storage unit 115 as a snapshot #7. The rollback control unit 105 searches the snapshot-appended information table 200, and replaces the snapshot column 203 of the line on which the snapshot #1 is stored with a character string of snapshot #6. It also searches the snapshot-appended information table 200, and replaces the snapshot column 203 of the line on which the snapshot #4 is stored with a character string of snapshot #7. Further, the rollback control unit 105 deletes the snapshot #1 and the snapshot #4 via the snapshot control unit 112.

(7) The rollback control unit 105 receives a rollback request message from the system administrator, and acquires from the message the virtual server X and the point of time T1, which is the time at the rollback destination (step 1207).

The point of time T1 of rollback destination is a past point of time to which the system administrator intends to roll back the virtual server X. The rollback control unit 105 returns the virtual server X to its state at the point of time T1. However, it is not exactly the state at the point of time T1, but setting changes consistent with policies set after the point of time T1 are applied to this state.

Incidentally, the processing at step 1207 is not limited to the reception of a rollback request message from the system administrator, but may include, for instance, detection by the rollback control unit 105 of the occurrence of a problem in the virtual server X and specification of the rollback destination time T1 as the point of time immediately before the occurrence of the problem. The point of time immediately before the occurrence of the problem is, if there was a setting change immediately before the occurrence of the problem for instance, the point of time immediately before that setting change. When specifying the point of time, the setting change table 300 is searched to identify the line on which the setting change which gave rise to the problem was stored, and the point of time stored in the time column 302 of the line is defined as the point of time at which the problem occurred.

(8) The rollback control unit 105 reads in from the snapshot managing unit 113 the snapshot-appended information table 200 stored in the storage unit 116 (step 1208).

(9) The rollback control unit 105 decides, on the basis of the snapshot-appended information table 200, on the rollback processing F which returns the virtual server X to the point of time T1 (step 1209).

Supposing that the virtual server X is the virtual server #1 and the point of time T1 is Jan. 13, 2008, the processing at step 1209 sill be described more specifically. When the rollback control unit 105 searches the snapshot-appended information table 200 to specify the line on which the virtual server #1 is stored in the virtual server column 202 and a point of time immediately before Jan. 13, 2008 is stored in the time column 201 and references the snapshot column 203 of the line, it finds the snapshot #7 stored. Therefore, it determines to roll back by using the snapshot #7 as the rollback processing F.

(10) The rollback control unit 105 reads in via the snapshot managing unit the snapshot S2 specified in the rollback processing F, and restores a virtual server V1 via the snapshot control unit by using the snapshot S2 (step 1210).

Supposing that the virtual server X is the virtual server #1 and the rollback processing F is rolling back by the use of the snapshot #7, the processing at step 1210 will be described more specifically. The rollback control unit 105 reads in the snapshot #7 via the snapshot managing unit 113, and restores the virtual server #1 by using the snapshot #7 via the snapshot control unit 111. This enables the virtual server #1 to be rolled back.

In this embodiment, as so far described, a second virtual server is generated by using the snapshot-appended information table 200 in which information for managing snapshots of the first and second virtual servers and the policy table 400 for storing policies whose requirements are to be met by the first virtual server of the objects of management; a snapshot of the first virtual server is read into the second virtual server with reference to management information in the snapshot-appended information table 200; if a setting change detected in response to a setting change by the first virtual server matches a policy stored in the policy table 400 the detected setting change is applied to the second virtual server and a snapshot of the second virtual server to which the setting change has been applied; and, in response to a rollback request, the snapshot of the second virtual server stored in the first virtual server is read in.

Embodiment 3

This embodiment is a third method of realizing resumption of a business system in the form of satisfying policy requirements immediately after rolling back a virtual server. It is achieved here by storing a snapshot of the virtual server immediately after processing of a setting change meeting the requirements of a policy defined in advance.

Figure 13:
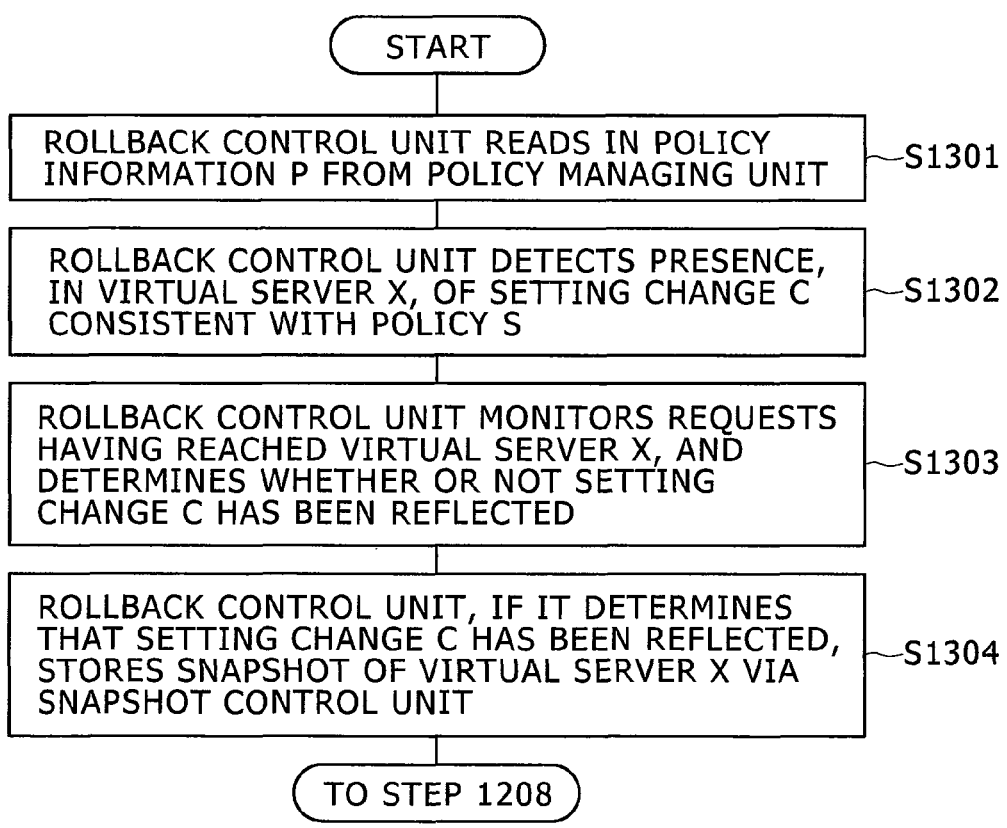
FIG. 13 is a flow chart showing the overall processing by an information processing system in Embodiment 3.

FIG. 13 charts the overall processing flow in this embodiment.

(1) The rollback control unit reads in policy information P from the policy managing unit (step 1301).

(2) The rollback control unit detects the presence, in the virtual server X, of a setting change C consistent with the policy S (step 1302).

(3) The rollback control unit monitors the input and output of the virtual server X, and determines whether or not the setting change C has been reflected (step 1303).

The I/O of the virtual server X here may be, for instance, a request message having arrived at the virtual server X. Or it may as well be a packet from the network or a request for reading or writing into a disk.

(4) The rollback control unit, if it determines that the setting change C has been reflected, stores the snapshot of the virtual server X via the snapshot control unit (step 1304).

(5) The rest of the processing is the same as step 1208 through step 1210.

In this embodiment, as so far described, detection of the setting change in the virtual server in Embodiment 2 is achieved when it is known that the number of requests made with the virtual server after the setting change in the virtual server has reached a prescribed value.

Embodiment 4

A fourth embodiment of the present invention is a method to resume the business system without problem after rolling back a virtual server. By this method, rollback is realized in business system units by using in the rollback snapshots storing virtual servers constituting the same business system at the same point of time and thereby problems are prevented from occurring.

Figure 14:
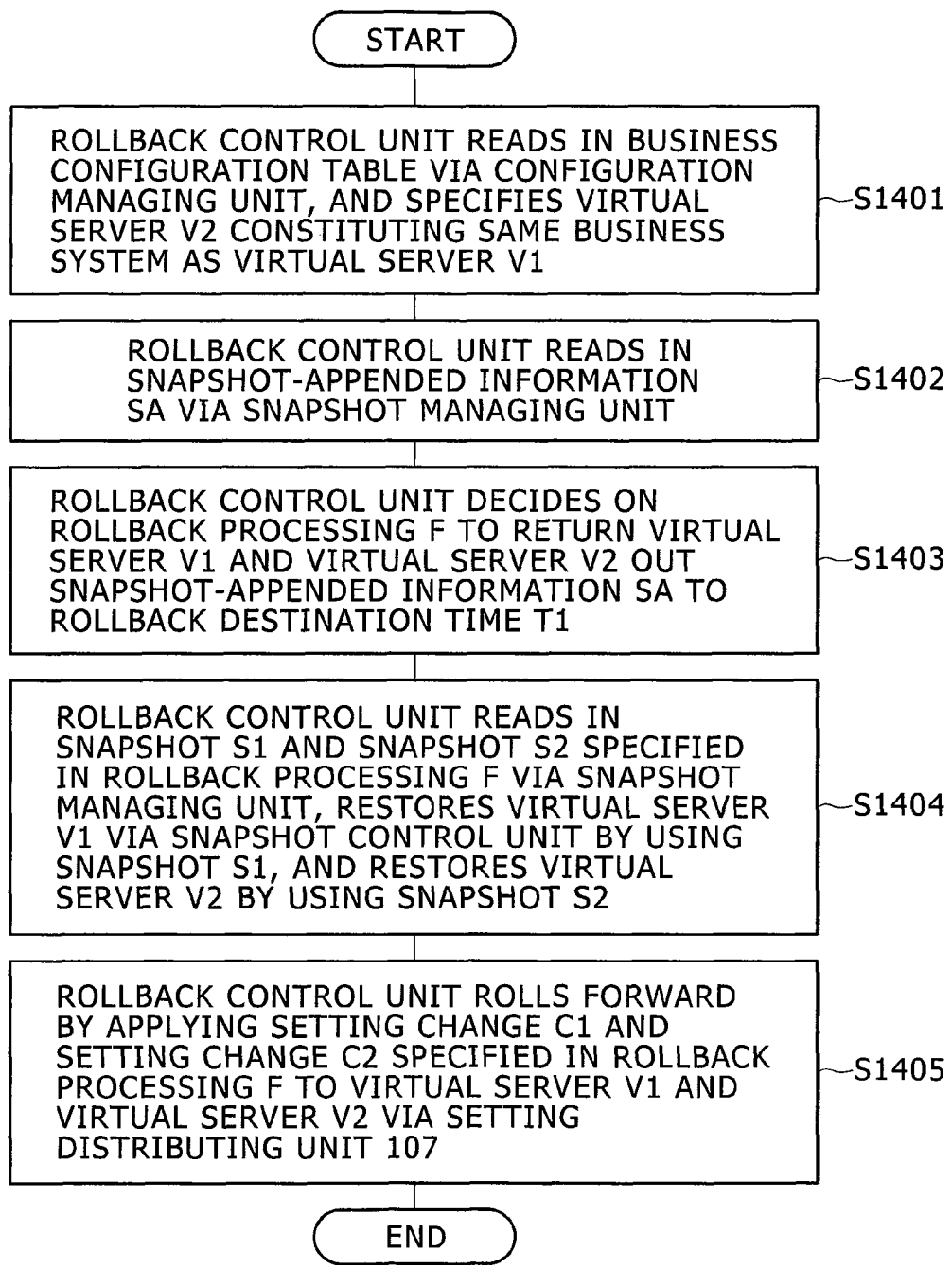
FIG. 14 is a flow chart showing the overall processing by an information processing system in Embodiment 4.

FIG. 14 charts the overall flow of rollback processing in this embodiment. It shows processing to roll back a business system by rolling it back with a snapshot storing each of the virtual servers constituting the same business system at the same point of time on the basis of the supposition that snapshots stored at the same point of time are matched in setting information.

(1) The rollback control unit 105 reads in the business configuration table 700 via the configuration managing unit 108, and specifies a virtual server V2 constituting the same business system as the virtual server V1 (step 1401).

More specifically, the processing is as follows. It is supposed that the rollback control unit 105 searches the business configuration table 700 and that the business system stored in the business system column 701 of the line whose virtual server column 702 is the virtual server V1 is designated as a business system G1. It is further supposed that the rollback control unit 105 searches the business configuration table 700 and that the virtual server stored in the business system column 701 of the line whose virtual server column stores the business system G1 is designated as the virtual server V2. If there are in the business system column 701 plural lines on which the business system G1 is stored, the virtual server stored on every one of the lines in the virtual server column 702 is acquired and designated as the virtual server V2.

(2) The rollback control unit 105 reads in the snapshot-appended information table 200 via the snapshot managing unit 113 (step 1402).

(3) The rollback control unit decides on the rollback processing F to return the virtual server V1 and the virtual server V2 out of the snapshot-appended information table 200 to the rollback destination time T1 (step 1403).

More specifically, the processing is as follows. The rollback control unit 105 searches, out of the snapshot-appended information table 200, the lines in whose time column 201 points of time on or before the rollback destination time T1 are stored, sequentially from the nearest past backward, for combinations of lines in which the time column 201 of the first line and the time column 201 of the second line store the same point of time, the virtual server V1 is stored on the first line and the virtual server V2 is stored on the second line both in the virtual server column 202. In this process, information stored in the snapshot column 203 of the first line is designated as the snapshot S1, and information stored in the snapshot column 203 of the second line is designated as the snapshot S2. Information items stored in the time column 201 of the first line and the second line are designated as respectively a point of time T21 and a point of time T22.

Then, the virtual server V1 is restored by using the snapshot S1, and the virtual server V2 is restored by using the snapshot S2.

Further, the rollback control unit 105 reads in the policy table 400 and the setting change table 300, and specifies out of the setting change table 300 a time setting change matching a policy defined in the policy table 400.

More specifically, the setting change table 300 is searched, a line or lines in whose time column 302 the points of time from T21 through T1 are stored and in whose object of change column 303 the virtual server V1 is stored are specified and only those satisfying policy definitions stored in the policy table out of the contents stored in the setting change column 305 are designated as C1. If plural lines are specified here, the action is applied to every one of those lines, and the contents stored in the setting change column 305 are designated as C1.

Similarly, the setting change table 300 is searched, a line or lines in whose time column 302 the points of time from T22 through T1 are stored and in whose object of change column 303 the virtual server V2 is stored are specified and only those satisfying policy definitions stored in the policy table 400 out of the contents stored in the setting change column 305 are designated as C2. If plural lines are specified here, the action is applied to every one of those lines, and the contents stored in the setting change column 305 are designated as C2.

Finally, the virtual server V1 is restored by using the snapshot S1, and roll forward processing to which the setting change C1 is applied is designated as the rollback processing F. The virtual server V2 is restored by using the snapshot S2, and roll forward processing to which the setting change C2 is applied is designated as the rollback processing F.

(4) The rollback control unit 105 reads in the snapshot S1 and the snapshot S2 specified in the rollback processing F via the snapshot managing unit 113, restores the virtual server V1 via the snapshot control unit by using the snapshot S1, and restores the virtual server V2 by using the snapshot S2 (step 1404).

(5) The rollback control unit 105 rolls forward by applying the setting change C1 and the setting change C2 specified in the rollback processing F to the virtual server V1 and the virtual server V2 via the setting distributing unit 107 (step 1405).

In this embodiment, as so far described, by using the snapshot-appended information table 200 which manages hysteresis information on the snapshots of plural virtual servers, the policy table 400 in which policies whose requirements are to be made by the virtual servers of the objects of management are stored, the business configuration table 700 which manages business configuration information on plural virtual servers, and the setting change table 300 which stores setting change information on plural virtual servers and in response to a rollback request, business configuration information is read in from the business configuration table 700, a list of virtual servers pertaining to businesses belonging to the virtual servers to which the rollback request is addressed is acquired from the business configuration information, hysteresis information on the snapshot of each of the virtual servers included in the list of virtual servers is acquired from the snapshot-appended information table 200, setting change information on each of the virtual servers included in the list of virtual servers is acquired from the setting change table 300, setting change information consistent with policies stored in the policy table 400 is selected from the acquired setting change information, the snapshots to be used for rolling back the virtual servers included in the list of virtual servers are determined, and the virtual servers included in the list of virtual servers are rolled back by using the determined snapshots and the selected setting change information.

Embodiment 5

Figure 15:
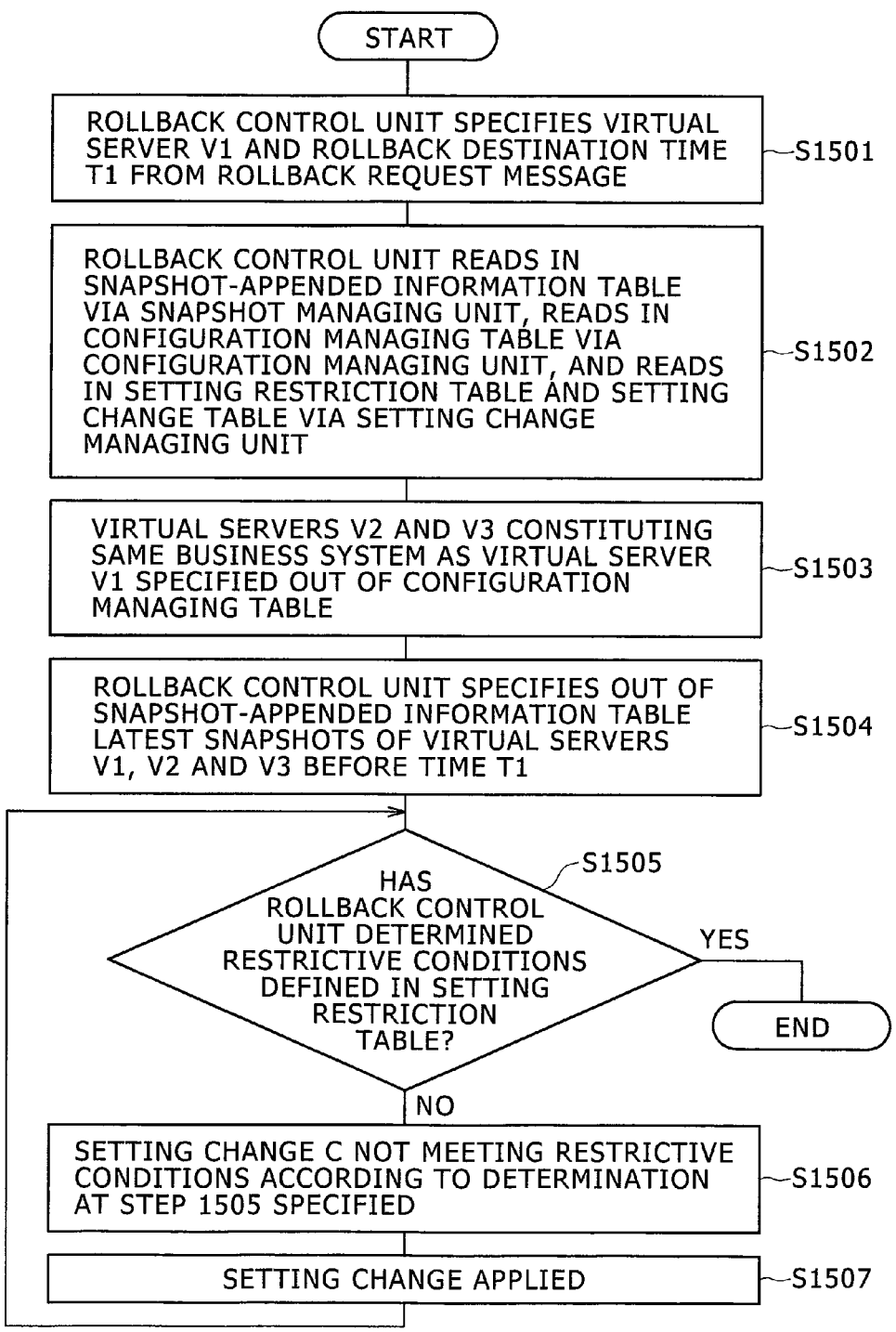
FIG. 15 is a flow chart showing the overall processing by an information processing system in Embodiment 5.

This embodiment of the present invention is a method to resume the business system without problem immediately after rolling back a virtual server, representing a partial alteration of the fourth embodiment. It is a method to realize rollback processing on a business-by-business basis. The description here refers to a method by which the snapshot of each of virtual servers satisfying restrictive conditions between items of setting information and rollback is achieved. Whereas a sixth embodiment of the invention is a similar method, this fifth embodiment eliminates mismatching between items of setting information and enables the business system to be resumed without problem by performing rollback, after restoration using snapshots at different points of time of plural virtual servers, by the execution of processing to apply setting changes which are in a relationship of setting restriction with one another FIG. 15 charts the overall flow of rollback processing in this embodiment.

(1) The rollback control unit 105 receives a rollback request message from the system administrator and specifies the virtual server V1 and the rollback destination time T1 from the rollback request message (step 1501).

Incidentally, the processing at step 1501 may be replaced by processing to have the rollback control unit 105 detect a problem with the virtual server V1 and specify the point of time T1 before the occurrence of problem instead of transmission of a rollback request message by the system administrator.

(2) The rollback control unit 105 reads in the snapshot-appended information table 200 via the snapshot managing unit 113, reads in the business configuration table 700 via the configuration managing unit 108, and reads in the setting restriction table 600 and the setting change table 300 via the setting change managing unit 106 (step 1502).

(3) The rollback control unit 105 specifies out of the business configuration table 700 the virtual server V2 constituting the same business system as the virtual server V1 (step 1503).

More specifically, each step of processing will be as follows. The business configuration table 700 is searched to specify the line in whose virtual server column 702 the virtual server V1 is stored, and information stored in the business system column 701 of the line is designated as the business system G1.

The business configuration table 700 is searched to specify the line in whose business system column 701 the business system G1 is stored, and information stored in the virtual server column 702 of the line is designated as the virtual server V2. If plural lines are specified here, the action is applied to every one of those lines.

(4) The rollback control unit 105 specifies out of the snapshot-appended information table 200 the latest snapshots S1 and S2 of the virtual servers V1 and V2 before the point of time T1 (step 1504).

More specifically, the processing is as follows. The snapshot-appended information table 200 is searched to specify lines in whose virtual server column 202 the virtual server V1 is stored and in whose time column 201 information before the point of time T1 is stored. Out of the specified lines, the snapshot column 203 of the line on which the latest point of time is stored is designated as the snapshot S1. The point of time stored in the time column 201 of the line is designated as the point of time T21.

The snapshot-appended information table 200 is searched to specify lines in whose virtual server column 202 the virtual server V2 is stored and in whose time column 201 information before the point of time T1 is stored. Out of the specified lines, the snapshot column 203 of the line on which the latest point of time is stored is designated as the snapshot S2. The point of time stored in the time column 201 is designated as the point of time T22.

(5) The rollback control unit determines restrictive conditions defined in the setting restriction table (step 1505).

More specifically, the processing is as follows. The following description will refer to a case in which the point of time T21 is the latest point of time, and the point of time T22 is the next latest.

The setting change table 300 is searched to specify lines in whose time column 302 the points of time from T21 through T22 are stored and in whose object of change column 303 the virtual server V2 is stored, and information stored in the setting change column 305 of the line is designated as C2. If plural lines are specified here, the action is applied to every one of those lines, whose pertinent information is designated as C2.

The setting restriction table 600 is searched to determine whether or not setting information which is the object of setting change specified by the setting change C2 is stored in the setting information column 602 and the restrictive information column 603 satisfies the restrictive conditions.

(6) The rollback control unit 105 specifies setting changes C not meeting restrictive conditions according to the determination at step 1505 (step 1506).

If the determination of whether or not setting information which is the object of setting change specified by the setting change C2 at step 1505 reveals the presence of any setting condition that is not met, the setting change C2 the setting change C3 failing meet that restrictive condition.

(7) The setting change C3 is applied (step 1007).

The rollback control unit 105 rolls forward the virtual server V2 by applying the setting change C3 via the setting distributing unit 107.

This embodiment, as so far described, has a setting restriction table for managing restrictive conditions among the items of setting information of plural virtual server in addition to the configuration Embodiment 4, and further selects from the selected setting change information setting change information that satisfies the restrictive conditions of the setting restriction table.

Incidentally, though every virtual server is rolled back in the foregoing embodiment, processing which excludes from rollback the virtual servers V2 and V3 which are free from setting restrictions is also possible.

This embodiment allows rolling back in business system units. It can also prevent the occurrence of secondary problems due to mismatching in setting information among virtual servers.

Whereas the OS often has to be restarted to have setting information reflected, since this embodiment enables the need for resetting of setting information after restoration with snapshots to be reduced, the number of OS restarts required for having setting changes reflected can be reduced, making it possible to shorten the duration of business suspension accompanying OS restarts.

Virtual servers can be rolled back by using snapshots differing in point of time. Or by rolling back virtual servers which are constituents of the same business system but have no setting restrictive relationship with any other virtual server by using the latest snapshot, the workload of resetting required setting information for returning to the point of time T1 can be reduced.

Embodiment 6

This embodiment of the present invention is a method to resume the business system without problem immediately after rolling back a virtual server, representing a partial alteration of the fourth embodiment. It is a method to realize rollback processing in business system units. The description here refers to a method by which the snapshots of virtual servers satisfying restrictive conditions among the items of setting information are specified from the snapshots of plural generations of virtual servers constituting the business system and rolling back is accomplished. Whereas the fifth embodiment similar to this embodiment, the method here eliminates mismatching among the items of setting information and enables the business system to be resumed without problem by achieving restoration by using snapshots of different points of time of plural virtual servers which satisfying the relationship of setting restrictions among the snapshots.

Figure 16:
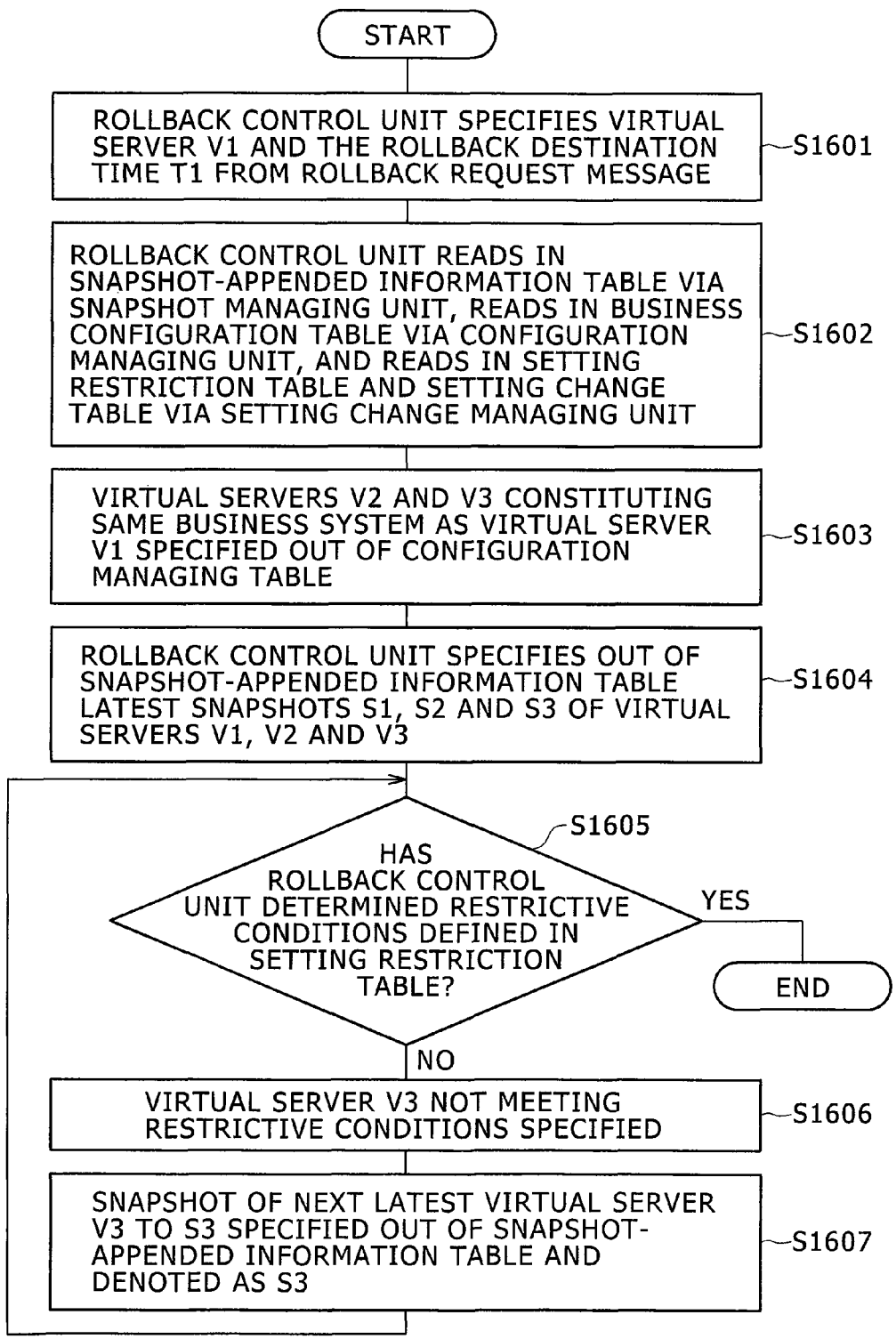
FIG. 16 is a flow chart showing the overall processing by an information processing system in Embodiment 6.

FIG. 16 charts the overall flow of rollback processing in this embodiment.

(1) The rollback control unit 105 receives a rollback request message from the system administrator and specifies the virtual server V1 and the rollback destination time T1 from the rollback request message (step 1601).

Incidentally, the processing at step 1601 may be replaced by processing to have the rollback control unit 105 detect a problem with the virtual server V1 and specify the point of time T1 before the occurrence of problem instead of transmission of a rollback request message by the system administrator.

(2) The rollback control unit 105 reads in the snapshot-appended information table via the snapshot managing unit, reads in the business configuration table 700 via the configuration managing unit, and reads in the setting restriction table 600 and the setting change table 300 via the setting change managing unit 106 (step 1602).

(3) The rollback control unit 105 specifies out of the business configuration table 700 the virtual servers V2 and V3 constituting the same business system as the virtual server V1 (step 1603).

(4) The rollback control unit 105 specifies out of the snapshot-appended information table 200 the latest snapshots S1, S2 and S3 of the virtual servers V1, V2 and V3 (step 1604).

More specifically, the processing is as follows. The snapshot-appended information table 200 is searched, and lines in whose virtual server column 202 the virtual server V1 is stored and in whose time column 201 information before the point of time T1 is stored are specified. Out of the specified lines, the snapshot column 203 of the line on which the latest point of time is stored is designated as the snapshot S1. The point of time stored in the time column 201 of the line is designated as the point of time T21. The snapshot-appended information table 200 is searched, and lines in whose virtual server column 202 the virtual server V2 is stored and in whose time column 201 information before the point of time T1 is stored are specified. Out of the specified lines, the snapshot column 203 of the line on which the latest point of time is stored is designated as the snapshot S2. The point of time stored in the time column 201 of the line is designated as the point of time T22. The snapshot-appended information table 200 is searched, and lines in whose virtual server column 202 the virtual server V3 is stored and in whose time column 201 information before the point of time T1 is stored are specified. Out of the specified lines, the snapshot column 203 of the line on which the latest point of time is stored is designated as the snapshot S3. The point of time stored in the time column 201 of the line is designated as the point of time T23. It is supposed here that T21 is the latest point of time, and T22 and T23 are earlier in that order.

(5) The rollback control unit 105 determines restrictive conditions defined in the setting restriction table (step 1605). If the determination reveals the satisfaction of the restrictive conditions, the processing is ended. Or it reveals failure to satisfy the restrictive conditions, the processing will advance to step 1606.

More specifically, the processing is as follows. The rollback control unit 105 searches the setting change table 300 to specify lines in whose time column 302 the points of time from T21 through T23 are stored and in whose object of change column 303 the virtual server V1 is stored, and information stored in the setting change column 305 of the line is designated as the setting change C1. The rollback control unit 105 searches the setting restriction table 600 to specify lines in whose setting information column 602 setting information specified by the setting change C1 is stored, and determines whether or not the conditions stored in the restrictive information column of the lines are satisfied. Further, the rollback control unit 105 searches the setting change table 300 to specify lines in whose time column 302 the points of time from T22 through T23 are stored and in whose object of change column 303 the virtual server V2 is stored, and information stored in the setting change column 305 of the line is designated as the setting change C2. The rollback control unit 105 also searches the setting restriction table 600 to specify lines in whose setting information column 602 the setting information specified by the setting change C2 is stored, and determines whether or not the conditions stored in the restrictive information column of the lines are satisfied.

(6) The rollback control unit 105 specifies virtual servers V not meeting restrictive conditions according to the determination at step 1605 (step 1606).

More specifically, the processing is as follows. If it is determined that the setting change C1 does not meet the conditions, the virtual server V1 is specified as a virtual server V failing to meet the restrictive conditions. If it is determined that the setting change C2 does not meet the conditions, the virtual server V2 is specified as a virtual server V failing to meet the restrictive conditions.

(7) The rollback control unit 105 specifies out of the snapshot-appended information table the snapshot of the next latest virtual server V and denotes it as S3 (step 1607), followed by a return to step 1605.

The rollback control unit 105 searches the snapshot-appended information table 200 to specify lines in whose virtual server column 202 the virtual server V1 is stored and in whose time column 201 points of time earlier than T21 are stored, and newly designates information stored in the snapshot column 203 of the line as the snapshot S1. Also, the point of time stored in the time column 201 of the line is newly designated as the point of time T21.

The rollback control unit 105 searches the snapshot-appended information table 200 to specify lines in whose virtual server column 202 the virtual server V2 is stored and in whose time column 201 points of time earlier than T22 are stored, and newly designates information stored in the snapshot column 203 as the snapshot S2. Also, the point of time stored in the time column 201 of the line is newly designated as the point of time T22. Upon the end of step 1607, the processing returns to step 1605.

Incidentally, in the embodiment as described above, every virtual server is rolled back, but processing which excludes from rollback the virtual servers V2 and V3 which are free from setting restrictions is also possible.

This embodiment allows rolling back in business system units. It can also prevent the occurrence of secondary problems due to mismatching in setting information among virtual servers.

Whereas the OS often has to be restarted to have setting information reflected, since this embodiment enables the need for resetting of setting information after restoration with snapshots to be reduced, the number of OS restarts required for having setting changes reflected can be reduced, making it possible to shorten the duration of business suspension accompanying OS restarts.

Virtual servers can be rolled back by using snapshots differing in point of time. Or by rolling back virtual servers which are constituents of the same business system but have no setting restrictive relationship with any other virtual server by using the latest snapshot, the workload of resetting required setting information for returning to the point of time T1 can be reduced.

The invention claimed is:

1. A method for remedying system trouble in virtual servers, comprising the steps of:
    in a managing server using a snapshot-appended information table which stores management information for managing snapshots of a virtual server, a setting change table which stores setting change information on the virtual server, and a policy table which stores policies to be satisfied by the virtual server,
    in accordance with a rollback request received together with a rollback time,
    acquiring the management information of a snapshot of the virtual server, the snapshot being acquired before the rollback time, from the snapshot-appended information table;
    acquiring the setting change information which is set between a time of acquiring a snapshot and the rollback time, from the setting change table;
    selecting a setting change information that coincides with a policy stored on the policy table, from the acquired setting change information;
    determining a snapshot to be used on a rollback, by referring to the acquired management information of the snapshot; and
    changing the selected setting change information corresponding with the determined snapshot, and rolling back the virtual server according to a changed snapshot.

2. A method for remedying system trouble in virtual servers, comprising the steps of:
    in a managing server using a snapshot-appended information table which stores management information for managing snapshots of a virtual server, a setting change table which stores setting change information on the virtual server, and a policy table which stores policies to be satisfied by the virtual server which is to be managed,
    in accordance with a rollback,
    acquiring the management information of a snapshot of the virtual server from the snapshot-appended information table;
    acquiring the setting change information from the setting change table;

selecting a setting change information that coincides with a policy stored on the policy table, from the acquired setting change information;

determining a snapshot to be used on a rollback, by referring to the acquired management information of the snapshot; and rolling back the virtual server by using the determined snapshot, and changing the selected setting change information for the virtual server which has been rolled back.

3. A method for remedying system trouble in virtual servers, comprising the steps of:

in a managing server using a snapshot-appended information table which stores management information for managing snapshots of a virtual server, a setting change table which stores setting change information on the virtual server, and a policy table which stores policies to be satisfied by the virtual server which is to be managed, in accordance with a rollback request received together with a rollback time, acquiring the management information of a snapshot of the virtual server, the snapshot being acquired before the rollback time, from the snapshot-appended information table;

acquiring the setting change information which is set between a time of acquiring a snapshot and the rollback time, from the setting change table;

selecting a setting change information that coincides with a policy stored on the policy table, from the acquired setting change information;

determining a snapshot to be used on a rollback, by referring to the acquired management information of the snapshot; and rolling back the virtual server by using the determined snapshot, and changing the selected setting change information for the virtual server which has been rolled back.

4. A method for remedying system trouble in virtual servers, comprising the steps of:

in a managing server using a snapshot-appended information table which stores management information for managing snapshots of a plurality of virtual servers, a policy table which stores policies to be satisfied by the virtual server which is to be managed, a business configuration table for managing business configuration information of the plurality of virtual servers, and a setting change table which stores setting change information on the virtual server, wherein one or more virtual servers may be constituents of a business system, in accordance with a rollback request, reading the business configuration information from the business configuration table;

acquiring a list of virtual servers that constitute the same business system as the virtual server according to the rollback request, from the business configuration information;

acquiring a hysteresis information of a snapshot for each of the virtual servers included in the list of virtual servers, from the snapshot-appended information table;

acquiring the setting change information for each of the virtual servers included in the list of virtual servers, from the setting change table;

selecting a setting change information that coincides with a policy stored on the policy table, from the acquired setting change information;

determining a plurality of snapshots to be used on a rollback of each of the virtual servers included in the list of virtual servers; and rolling back collectively each of the virtual servers included in the list of virtual servers by using a plurality of the determined snapshots and the selected setting change information.

5. The method for remedying system trouble in virtual servers according to claim 4, wherein the rollback request further includes a rollback time, the plurality of the determined snapshots are acquired at the same time before the rollback time.

6. The method for remedying system trouble in virtual servers according to claim 4, wherein the rollback request further includes a rollback time, the plurality of the determined snapshots are acquired at the same time before the rollback time, and the time on which each of the plurality of the determined snapshots are acquired are different to each other.

7. A method for remedying system trouble in virtual servers, comprising the steps of:

in a managing server using a snapshot-appended information table which stores management information for managing snapshots of a plurality of virtual servers, a business configuration table for managing business configuration information of the plurality of virtual servers, a setting change table which stores setting change information on the virtual server, and a setting restriction table which stores restriction condition among a setting information, wherein one or more virtual servers may be constituents of a business system, in accordance with a rollback request, reading the business configuration information from the business configuration table;

acquiring a list of virtual servers that constitute the same business system as the virtual server according to the rollback request, from the business configuration information;

acquiring a hysteresis information of a snapshot for each of virtual servers included in the list of virtual servers, from the snapshot-appended information table;

acquiring the setting change information for each of the virtual servers included in the list of virtual servers, from the setting change table;

selecting a setting change information that coincides with a policy stored on the policy table, from the acquired setting change information;

deciding whether or not the acquired setting change information coincides with the restriction condition stored on the setting restriction table;

determining a snapshot to be used on a rollback of the virtual server which does not coincide with the restriction condition, among each of the virtual servers included in the list of virtual servers;

rolling back each of the virtual servers included in the list of virtual servers by using the determined snapshots and the selected setting change information.

* * * * *